United States Patent
Ogihara

[19]

[11] Patent Number: 5,869,110
[45] Date of Patent: Feb. 9, 1999

[54] CONTAINER MOLDING APPARATUS

[75] Inventor: Shuichi Ogihara, Komoro, Japan

[73] Assignee: Nissei ASB Machine Co., Ltd., Nagano, Japan

[21] Appl. No.: 944,905

[22] Filed: Oct. 6, 1997

Related U.S. Application Data

[63] Continuation-in-part of Ser. No. 474,746, Jun. 7, 1995, Pat. No. 5,744,176.

[30] Foreign Application Priority Data

| Sep. 16, 1994 | [JP] | Japan | 6-248416 |
| Oct. 7, 1996 | [JP] | Japan | 8-284665 |

[51] Int. Cl.⁶ .................................................. B29C 49/64
[52] U.S. Cl. .......................... 425/526; 264/520; 264/521; 425/529; 425/534
[58] Field of Search ................... 425/526, 529, 425/534; 264/520, 521, 535

[56] References Cited

U.S. PATENT DOCUMENTS

| 3,787,170 | 1/1974 | Gilbert | 425/526 |
| 3,892,830 | 7/1975 | Hudson et al. | 264/535 |
| 3,963,399 | 6/1976 | Zavasnik | 425/52 |
| 4,102,626 | 7/1978 | Scharrenbroich | 425/526 |
| 4,140,464 | 2/1979 | Spurr et al. | 425/533 |
| 4,140,468 | 2/1979 | Duga | 425/534 |

(List continued on next page.)

FOREIGN PATENT DOCUMENTS

| 0058947 | 9/1982 | European Pat. Off. . | |
| 0266804 | 5/1988 | European Pat. Off. . | |
| 0534367 | 3/1993 | European Pat. Off. . | |
| 2343588 | 10/1977 | France . | |
| 2389580 | 12/1978 | France . | |
| 2056617 | 6/1972 | Germany . | |
| 4033531 | 5/1992 | Germany . | |
| 4212115 A1 | 6/1993 | Germany | 425/526 |
| 56-49736 | 11/1981 | Japan | 264/520 |
| 631654 | 8/1982 | Switzerland . | |
| 2062534 | 5/1981 | United Kingdom . | |
| 2093396 | 9/1982 | United Kingdom . | |
| 2097322 | 11/1982 | United Kingdom . | |

OTHER PUBLICATIONS

By E. Neumann, "Blasformen von Mehrwegflaschen." in *Kunststoffe*, vol. 83, No. 5, May 1993, pp. 343–347, Germany.

By Haldenwanger, Mineif, Arnegger and Schuler, "Kunstoff–Motorbauteile in Ausschmelzkerntechnik am Beispiel Eines Saugrohres," in *Automobiltechnische Zeitschrift*, vol. 89, No. 3, pp. 139–143, Mar. 1987, Germany.

Patent Abstracts of Japan, JP60180814, vol. 10, No. 21, (M–449), Katashi, "Stretching Blow Molding System," Sep. 1985.

*Primary Examiner*—Robert Davis
*Attorney, Agent, or Firm*—Cislo & Thomas LLP; David L. Hoffman, Esq.

[57] ABSTRACT

An apparatus for molding a container has a standby section disposed between a heating section and a blow molding section. A preform is supported by carrier members, and is intermittently carried from the heating section via the standby section to the blow molding section. In the standby section are provided a temperature conditioning member which conditions temperature on the preform carried from the heating section; a positioning plate which positions a carrier member stopped at the standby section; and a cylinder which advances and withdraws the temperature conditioning member with respect to the preform, and simultaneously advances and withdraws the positioning plate with respect to the carrier member. The advanced positioning plate contacts with the carrier member to position the carrier member. The advanced temperature conditioning member is set enabling temperature conditioning of the preform. By withdrawing the temperature conditioning member and positioning plate, the preform may be carried by the carrier member.

13 Claims, 29 Drawing Sheets

U.S. PATENT DOCUMENTS

| | | | |
|---|---|---|---|
| 4,204,111 | 5/1980 | Yonko | 425/526 |
| 4,209,290 | 6/1980 | Rees et al. | 425/526 |
| 4,225,304 | 9/1980 | Valyi | 425/526 |
| 4,239,475 | 12/1980 | Rainville | 425/526 |
| 4,261,949 | 4/1981 | Spurr et al. | 264/535 |
| 4,280,805 | 7/1981 | Hafele | 425/526 |
| 4,310,282 | 1/1982 | Spurr et al. | 414/753 |
| 4,313,720 | 2/1982 | Spurr | 425/526 |
| 4,330,255 | 5/1982 | Suzuki | 425/529 |
| 4,391,578 | 7/1983 | Schaar | 425/534 |
| 4,405,556 | 9/1983 | Valyi | 425/533 |
| 4,412,806 | 11/1983 | Gaiser et al. | 425/533 |
| 4,439,393 | 3/1984 | Saito et al. | 264/521 |
| 4,522,581 | 6/1985 | Schad et al. | 425/534 |
| 4,690,633 | 9/1987 | Schad et al. | 425/526 |
| 4,693,375 | 9/1987 | Schweers | 425/534 |
| 4,729,732 | 3/1988 | Schad et al. | 425/526 |
| 4,747,769 | 5/1988 | Nakamura et al. | 425/529 |
| 4,793,960 | 12/1988 | Schad et al. | 264/535 |
| 4,929,450 | 5/1990 | Takakusaki et al. | 425/526 |
| 5,206,039 | 4/1993 | Valyi | 425/526 |
| 5,261,809 | 11/1993 | Koga | 425/534 |
| 5,297,950 | 3/1994 | Kresak | 425/534 |
| 5,308,237 | 5/1994 | Kieran | 425/534 |
| 5,352,402 | 10/1994 | Orimoto et al. | 264/526 |
| 5,424,022 | 6/1995 | Koga | 425/533 |
| 5,501,590 | 3/1996 | Orimoto et al. | 425/526 |
| 5,589,130 | 12/1996 | Takada et al. | 425/534 |

CONTAINER MOLDING APPARATUS

CROSS-REFERENCE TO RELATED APPLICATION

This application is a continuation-in-part of application Ser. No. 08/474,746 filed Jun. 7, 1995 and now U.S. Pat. No. 5,744,176.

BACKGROUND OF THE INVENTION

The present invention relates to a molding apparatus and method for containers, and particularly to such apparatus and method in which between a heating section and a blow molding section, the temperature of preforms is conditioned in a standby section.

Methods for blow molding a container from a cylindrical preform (parison) include that known as the cold parison or 2-stage method and that known as the hot parison or 1-stage method. In the cold parison method (2-stage method), a preform at room temperature must be heated to at least the temperature at which blow molding becomes possible, or the so-called blow molding temperature, and in the hot parison method (1-stage method), heating is not required for as long as in the cold parison method, but it is still necessary to heat to at least the blow molding temperature since the preform retains the heat from the injection molding stage.

In both of these methods, the heating to the blow molding temperature is carried out uniformly around the circumferential direction of the preform.

On the other hand, when blow molding containers of special shape, such flat containers, if a preform is used with just the above described heating, this produces portions of the container with thick walls and other portions with thin walls since there are portions which are stretched greatly and portions which are stretched much less.

To avoid this situation, it is necessary to apply a temperature distribution to the preform, so that the portions which are stretched more are at a lower temperature than other portions. To apply such a temperature distribution, partial temperature conditioning must be applied to the preform.

However, adding the temperature conditioning apparatus to implement such partial temperature conditioning of the preforms makes the molding apparatus large, and not only is it not possible to save space, but also the cost is increased.

SUMMARY OF THE INVENTION

The object of the present invention is the provision of a container molding apparatus and molding method which, without increasing the size of the apparatus, allows partial temperature conditioning, and makes possible space-saving and cost reduction.

Another object of the present invention is the provision of a container molding apparatus and molding method which allows partial temperature conditioning with a high positioning accuracy for the preform surfaces to be subjected to temperature conditioning.

A further object of the present invention is the provision of a container molding apparatus and molding method in which the preform surfaces to be subjected to temperature conditioning can be carried in a different orientation from that at the time of temperature conditioning.

One aspect of the present invention comprises:
a heating section for heating a preform made of synthetic resin to at least a blow molding temperature;
a blow molding section for blow molding the preform which is heated at the heating section into the container;
a standby section being disposed between the heating section and the blow molding section, the standby section for putting the heated preform on standby; and
a carrying means for intermittently carrying the preform supported by a carrier member from the heating section to the blow molding section via the standby section; and
wherein the standby section comprises:
a temperature conditioning means for conditioning the temperature of at least one part of a surface to be temperature-conditioned of the preform carried from the heating section;
a positioning means for positioning the carrier member by contacting with the carrier member supporting the preform;
a first advancing and withdrawing drive means for advancing and withdrawing the temperature conditioning means with respect to the preform; and
a second advancing and withdrawing drive means for advancing and withdrawing the positioning means with respect to the carrier member.

According to one aspect of the present invention, a temperature conditioning means is provided at a standby section which is disposed between the heating section and the blow molding section. In this standby section, while the temperatures of the inner and outer surfaces are made more uniform, temperature of a part of the surfaces of the preforms to be subject to temperature conditioning can be simultaneously conditioned. Thus vacant space in the standby section can be exploited efficiently for the disposition of the temperature conditioning means, and without causing the molding apparatus for a container to be bulky, the cost of the apparatus can be reduced. Additionally, by applying partial temperature conditioning to the surface of the preform, the thickness after the region has stretched during blow molding can be adjusted as desired. Since this temperature conditioning is carried out previous to the blow molding step, partial temperature conditioning of high effectiveness can be expected.

In particular, since the carrier member carrying the preform is subject to positioning, temperature conditioning can be carried out accurately on the surface previously defined as the region of the trunk portion of the preform to which temperature conditioning is to be carried out. Furthermore, the mere advancing and withdrawing driving of the temperature conditioning means and the positioning means allows movement of them between an operating position and a withdrawn position. It should be noted that the first and second advancing and withdrawing drive means may share the same power source.

The temperature conditioning means may be either a cooling means for partially cooling the preform, or a heating means partially for heating the preform. If the preform is cooled, the portions of the cooled surface of the preform become less stretchable, and if it is heated the portions of the heated surface of the preform become more stretchable. Therefore, by using either heating or cooling, the thickness distribution of the container can be adjusted. As an example of a preform requiring partial cooling, the preform used for molding a container of special shape, such as a flat container may be cited. Examples of a preform requiring partial heating may be the heating of the trunk portion of a preform corresponding to a shoulder portion of the container in order to produce a state in which stretch is easier, or reheating used for example for thick portions for which the heating in the heating section is inadequate.

Temperature conditioning means may include a temperature conditioning member which conditions temperature by contacting with the at least one part of the surface of the preform. In this case, since temperature conditioning is carried out only on the part of the surface with which the temperature conditioning member contacts, the partial temperature conditioning can be carried out with higher positional accuracy. Alternatively, the temperature conditioning means may also include a temperature conditioning member which conditions temperature on the at least one part of the surface of the preform without contacting therewith. As this type of temperature conditioning member, the use of an air nozzle blowing hot air or cold air at the preform may be cited. Alternatively, radiant heat can be used for heating or cooling of the preform. In particular, using the non-contact method there is the advantage of carrying out the temperature conditioning without applying mechanical pressure to the preform. Moreover, using the non-contact method, there is no sharp boundary between the temperature-conditioned area and the non-temperature-conditioned area, and this makes the unevenness of the wall thickness less recognizable.

It is preferable for the carrier member of the present invention to comprise a circulatory carrying path in which the carrying member is carried circulatorily; and wherein the temperature conditioning means, the positioning means, and the first and second advancing and withdrawing drive means are disposed exterior to the circulatory carrying path.

The number of components is relatively low on the exterior side of the circulatory carrying path, and this allows this free space to be exploited efficiently for disposing the components required for the operation of the standby section.

Preferably, at least one of leading and trailing portions of the preform surface in a carrying direction of the preform is the at least one part of the surface of the preform. If this is the case, the first advancing and withdrawing drive means may advance and withdraw the temperature conditioning means in an intersecting direction with the carrying direction of the preform.

Furthermore in this case, the temperature conditioning means may comprise a first temperature conditioning member contacting with the leading portions (of the preform surface) of the preform, and a second temperature conditioning member contacting with the trailing portions (of the preform surface) of the preform. To cause the first and second temperature conditioning members to contact with the preform, opening and closing means which opens and closes the first and second temperature conditioning members may be provided.

The standby section may further comprise a rotation drive means which rotates the carrier member and changes the orientation of the part of the surface of the preform.

In this way, even if the orientation of the part of the surface of the preform to be temperature-conditioned is restricted by the relationship with the temperature conditioning means during the temperature conditioning, the orientation may be changed afterwards as desired by rotating the preform with the rotation drive means. It is therefore possible to change the orientation of the part of the surface to be temperature conditioned as desired, based on the relationship with the blow cavity mold at the blow molding section.

In order to rotate the carrier member, it is preferable for the carrier member to further comprise a sprocket. In this case, the rotation drive means may comprise a rack engaging with the sprocket of the carrier member and a linear movement means linearly moving the rack. In particular, the sprocket provided at the carrier member may be used for rotating the preform at the heating section to ensure uniform heating in the circumferential direction.

The rotation drive means may also comprise a raising and lowering means for raising and lowering the rack. In this case, before the withdrawal of the positioning means and the temperature conditioning means by the first and second advancing and withdrawing drive means the rack may be raised or lowered to engage with the sprocket. Thereafter, if the rack is moved simultaneously with the withdrawing movement of the positioning means and the temperature conditioning means, the preform can be rotated. As a result, the linear movement means and the first and second advancing and withdrawing drive means may share the same power source. Since the preform is rotated simultaneously with the withdrawing movement of the positioning means and the temperature conditioning means, the operation time in the standby section can be reduced.

DETAILED DESCRIPTION OF THE PREFERRED EMBODIMENTS

A preferred embodiment wherein the method and apparatus of the invention are applied will be described below with reference to the accompanying drawings.

Overall Constitution of the Apparatus

Figure 1:
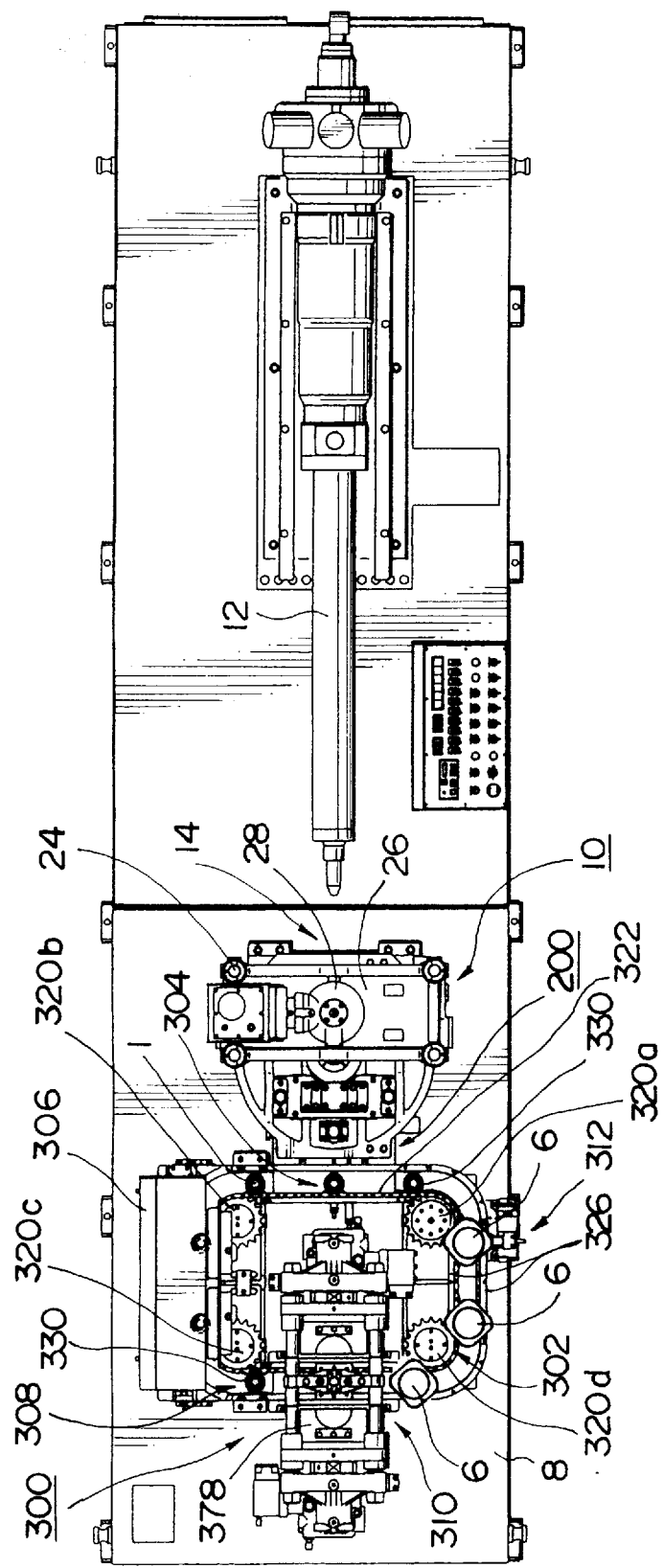
FIG. 1 is a plan view of a preferred embodiment of the invention.
Figure 2:
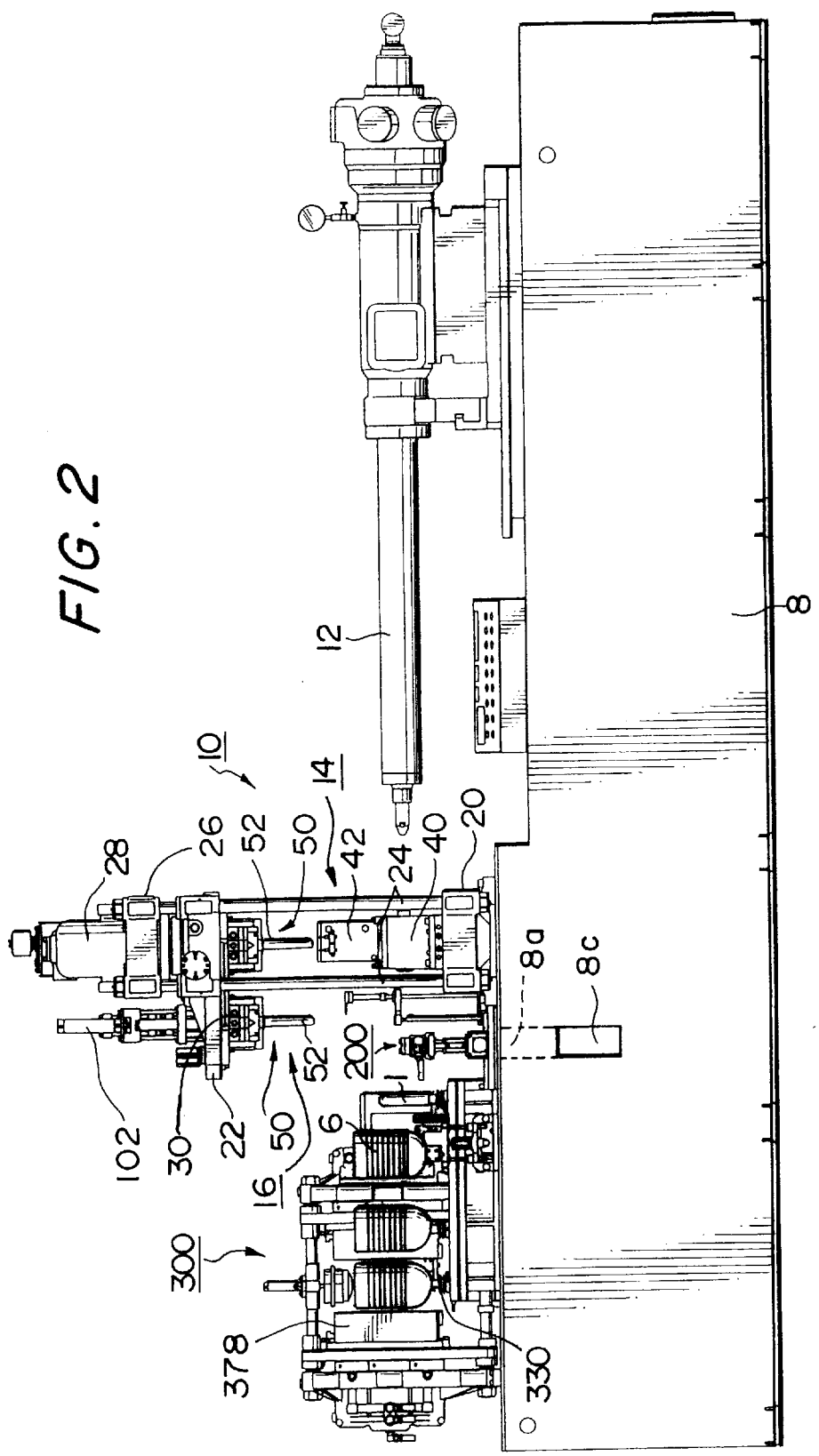
FIG. 2 is a front view of the preferred embodiment apparatus shown in FIG. 1.
Figure 3:
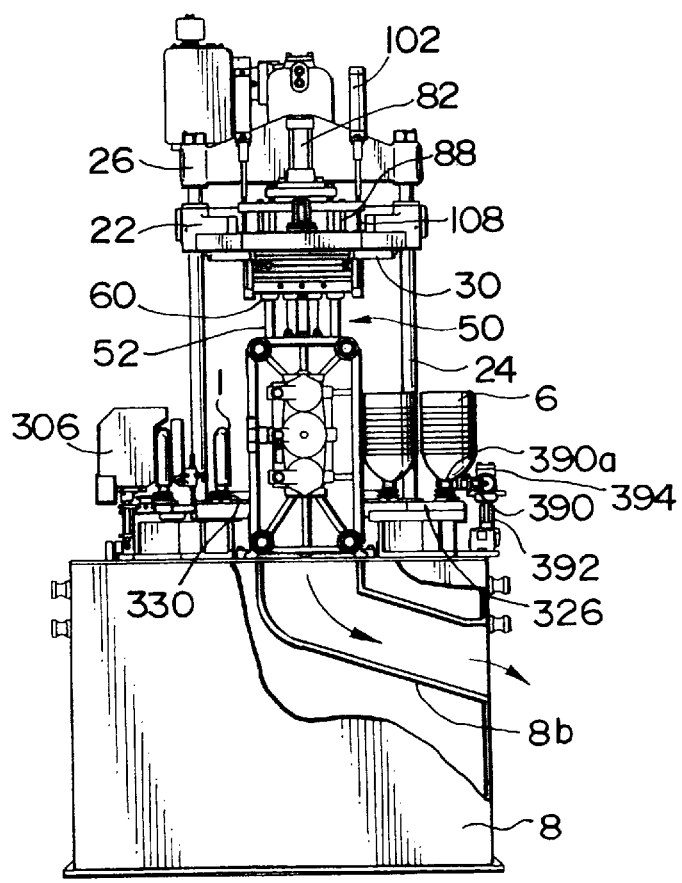
FIG. 3 is a left side view of the preferred embodiment apparatus shown in FIG. 1.
Figure 4:
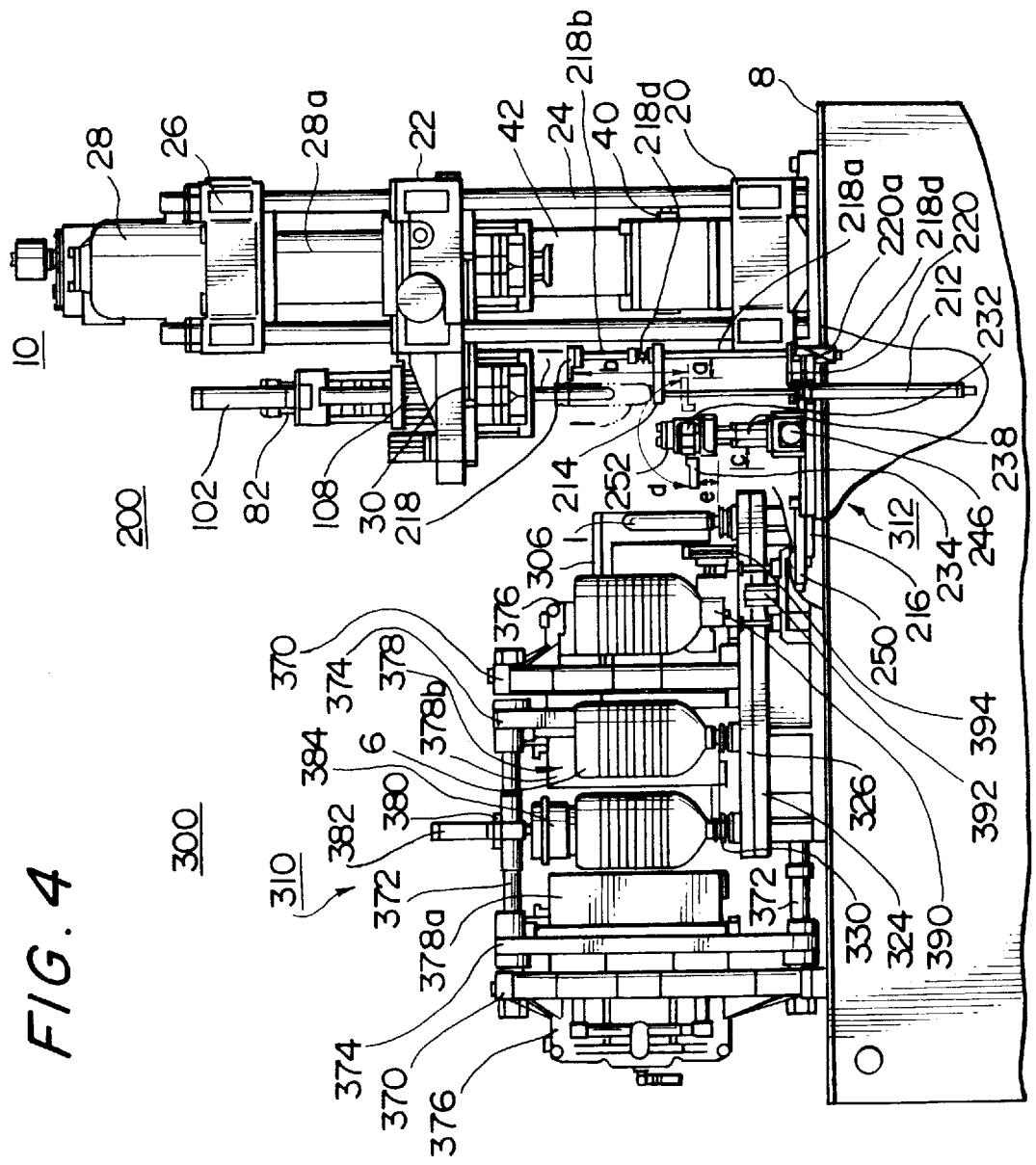
FIG. 4 is an enlarged view of the main parts of the apparatus shown in FIG. 1.

FIG. 1, FIG. 2 and FIG. 3 respectively are a plan view, a front view and a left side view of the apparatus of this preferred embodiment, and FIG. 4 is an enlarged view showing the main parts of the apparatus of the preferred embodiment.

As shown in the drawings, the apparatus comprises a preform molding station 10, a transfer station 200 and a blow molding station 300 disposed on a machine bed 8.

As shown in FIG. 2, the preform molding station 10 has a rotary disc 30 which has an injection core mold 50 in each of two locations an angle of rotation 180° apart and is a first circulatory carrier which circulatorily carries the injection core molds 50 intermittently along a rotary carrying path. An injection molding section 14 facing an injecting apparatus 12 and a preform ejecting section 16 facing this injection molding section 14 are respectively provided at the stopping positions of the injection core molds 50. The injection molding section 14 has an injection cavity mold 42 to which an injection core mold 50 can be clamped, and with this injection cavity mold 42 the injection molding section 14 simultaneously injection molds N (N≧2), for example N=4, preforms 1 at a time. In the preform ejecting section 16, the injection core mold 50 is released from the preforms 1. In this preferred embodiment, a neck portion of each preform 1 is molded by means of a neck cavity mold 60 which will be further discussed later, and the preforms 1 are held by this neck cavity mold 60 and the injection core mold 50 and carried by the rotary disc 30 to the preform ejecting section 16. In the preform ejecting section 16 the preforms 1 are ejected by being released from the neck cavity mold 60 after a partial release of the injection core mold 50.

As shown in FIG. 1, the blow molding station 300 has a second circulatory carrier 302 comprising four sprockets 320a to 320d and a carrier chain 322 running around these sprockets. A plurality of for example ten carrier members 330 are fixed to this carrier chain 322 uniformly spaced apart, and a preform 1 or a bottle 6 is supported by each carrier member 330. In the carrying path of the carrier members 330 are provided a preform receiving section 304 which receives the preforms 1 from the transfer station 200, a heating section 306 which heats the preforms 1, a standby section 308 which causes the heated preforms 1 to temporarily standby, a blow molding section 310 which blow molds the preforms 1 into bottles 6, and a bottle ejecting section 312 which ejects the bottles 6 to outside the apparatus.

The blow molding section 310 has a blow mold 378 which is clamped around the preforms 1 and blow molds one bottle 6 from each of n (1≦n<N) preforms 1, for example n=1 preform 1.

The transfer station 200 transfers the preforms 1 ejected from the preform ejecting section 16 of the preform molding station 10 to the preform receiving section 304 of the blow molding station 300. In the preform ejecting section 16 of the preform molding station 10 N preforms 1, i.e. the number of preforms 1 simultaneously molded in the injection molding section 14, are ejected at a time, but in the transfer station 200 n preforms 1, i.e. the number of preforms 1 simultaneously molded in the blow molding section 310 of the blow molding station 300, are transferred at a time. In the apparatus of this preferred embodiment, four preforms 1 simultaneously ejected by the preform ejecting section 16 are transferred one at a time to the preform receiving section 304. Also, whereas in the preform molding station 10 the preforms 1 are injection molded in an upright state, in the transfer station 200 the preforms 1 are turned upside-down and transferred to the blow molding station 300 in an inverted state.

Preform Molding Station 10

First the preform molding station 10 will be described, with reference to FIG. 1 to FIG. 11.

Injection Molding Section 14 and First Circulatory Carrier 30

As shown in FIG. 2 and FIG. 4, the injection molding section 14 of the preform molding station 10 is provided with a lower clamping plate 20 mounted on the machine bed 8. A for example circular upper clamping plate 22 is disposed above this lower mold clamping plate 20 and extends from the injection molding section 14 into the preform ejecting section 16. This upper mold clamping plate 22 is movable vertically along four tie bars 24 provided in four locations around the injection molding section 14. As shown in FIG. 1, FIG. 2 and FIG. 4, a fixed plate 26 is mounted on the upper ends of the tie bars 24 and a clamping cylinder 28 is mounted on this fixed plate 26. The clamping cylinder 28 drives a clamping rod 28a (see FIG. 4), and the upper clamping plate 22 is driven up and down by this clamping rod 28a.

Figure 5:
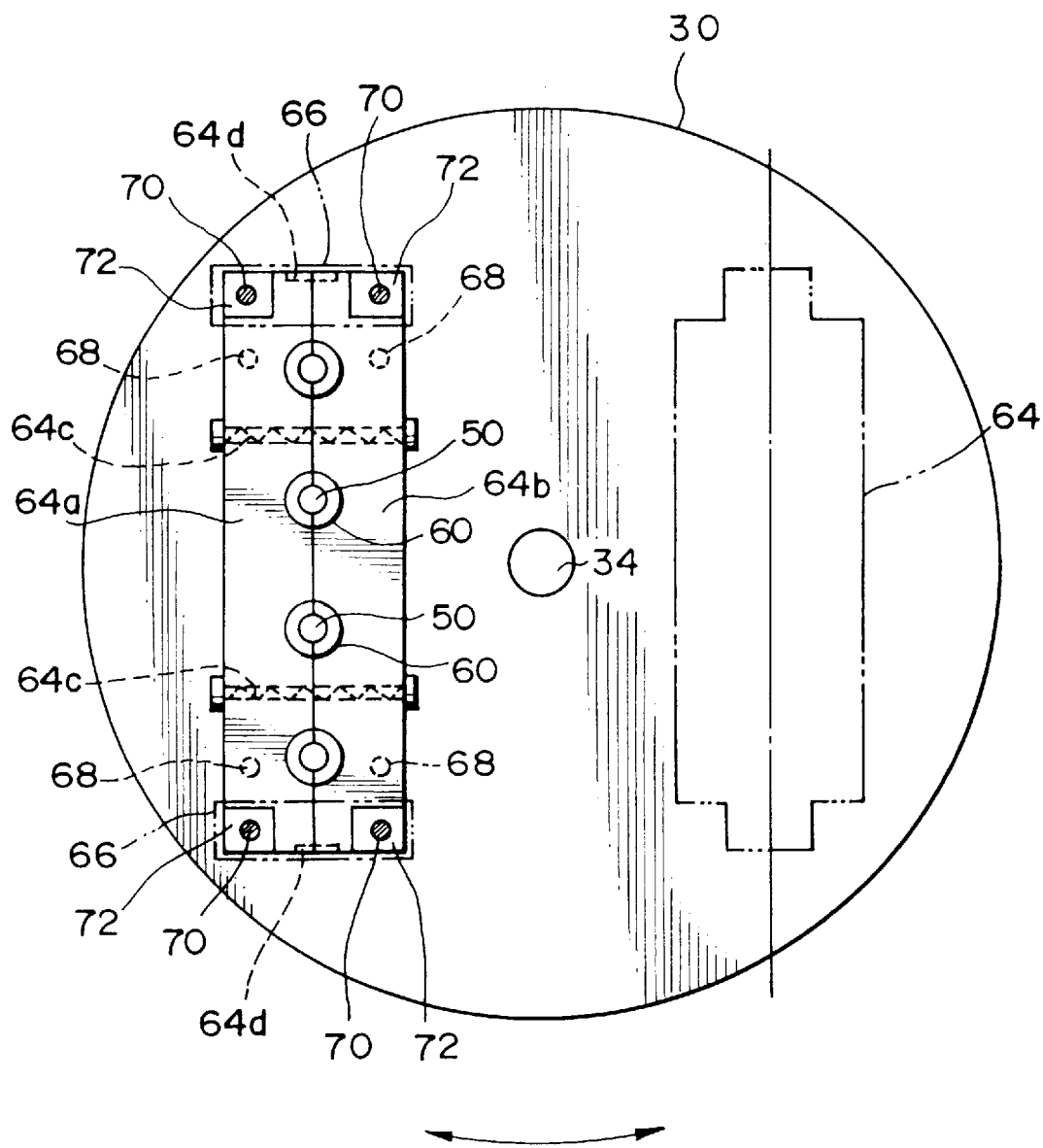
FIG. 5 is an underside view of a rotary disc.
Figure 7:
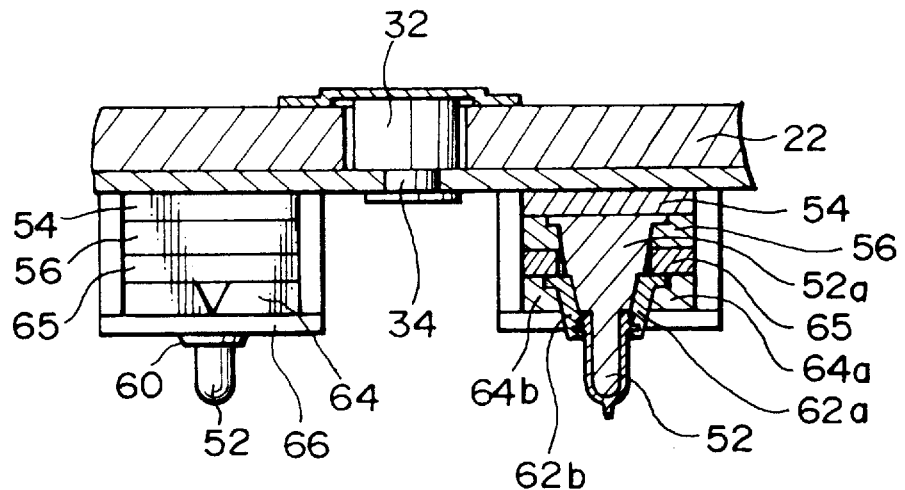
FIG. 7 is a partially sectional view showing the injection core mold and a neck cavity mold mounted on the rotary disc.

As shown in FIG. 2 to FIG. 4, the rotary disc 30 constituting the first circulatory carrier is rotatably mounted at the underside of the upper clamping plate 22. As shown in FIG. 7, this rotary disc 30 is fixed to a rotational shaft 34 rotationally driven by a rotary actuator 32 fixed to the upper clamping plate 22. As shown in FIG. 5, which is an underside view of the rotary disc 30, the two injection core molds 50 and the two neck cavity molds 60 are mounted on the rotary disc 30 in positions corresponding to the injection molding section 14 and the preform ejecting section 16. The details of the injection core molds 50 and the neck cavity molds 60 will be discussed in detail later.

As shown in FIG. 2 and FIG. 4, the injection molding section 14 is provided with a hot runner mold 40 with which a nozzle of the injecting apparatus 12 nozzle-touches, and the injection cavity mold 42 is mounted on this hot runner mold 40. This injection cavity mold 42 has a cavity for each of the N preforms 1 simultaneously molded in the injection molding section 14, for example four cavities. This injection cavity mold 42 is capable of cooling the injection molded preforms, and a coolant, for example water at room temperature, is circulated therethrough.

As shown in FIG. 4 to FIG. 8, the two injection core molds 50 mounted on the rotary disc 30 each have the same number of core pins 52 as the number N of preforms simultaneously molded, for example four core pins 52. As shown in FIG. 7, the base portions 52a of these core pins 52 are supported by a core presser plate 54 fixed to the underside of the rotary disc 30 and a core fixing plate 56 fixed to the underside of this core presser plate 54. When the clamping cylinder 28 is driven and the clamping rod 28a drives down the upper clamping plate 22, the core pins 52 of the injection core mold 50 are driven down integrally with the rotary disc 30, the core presser plate 54 and the core fixing plate 56 mounted on this upper clamping plate 22 and are thereby clamped onto the injection cavity mold 42.

Figure 11:
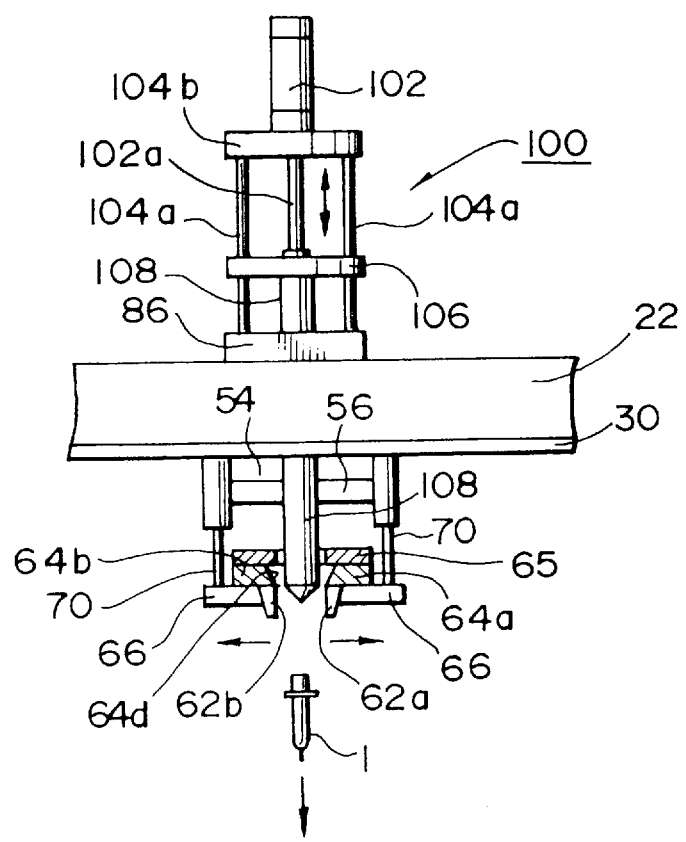
FIG. 11 is a partially sectional view illustrating a preform ejecting operation.

As shown in FIG. 7 and FIG. 11, the two neck cavity molds 60 mounted on the rotary disc 30 are made up of pairs of split molds 62a and 62b, each neck cavity mold 60 comprising the same number of pairs of split molds 62a and 62b as the number N of preforms simultaneously molded, for example four. The pairs of split molds 62a and 62b of each neck cavity mold 60 are fixed by split plates 64a and 64b, and these split plates 64a and 64b constitute a neck fixing plate 64. As shown in FIG. 11, a neck presser plate 65 which pushes this neck fixing plate 64 downward is disposed on the upper surface side of the split plates 64a and 64b. Also, there are provided guide plates 66 which support the undersides of the ends of the neck fixing plate 64. The split plates 64a and 64b are kept normally closed by springs 64c shown in FIG. 5. As shown in FIG. 5, a wedge hole 64d is provided at each end of the split plates 64a and 64b. After the neck fixing plate 64 has been carried into the preform ejecting section 16, the split plates 64a and 64b are opened by being driven apart along the guide plates 66 by split plate opening cams 108, which will be further discussed later, driven into the wedge holes 64d.

Figure 6:
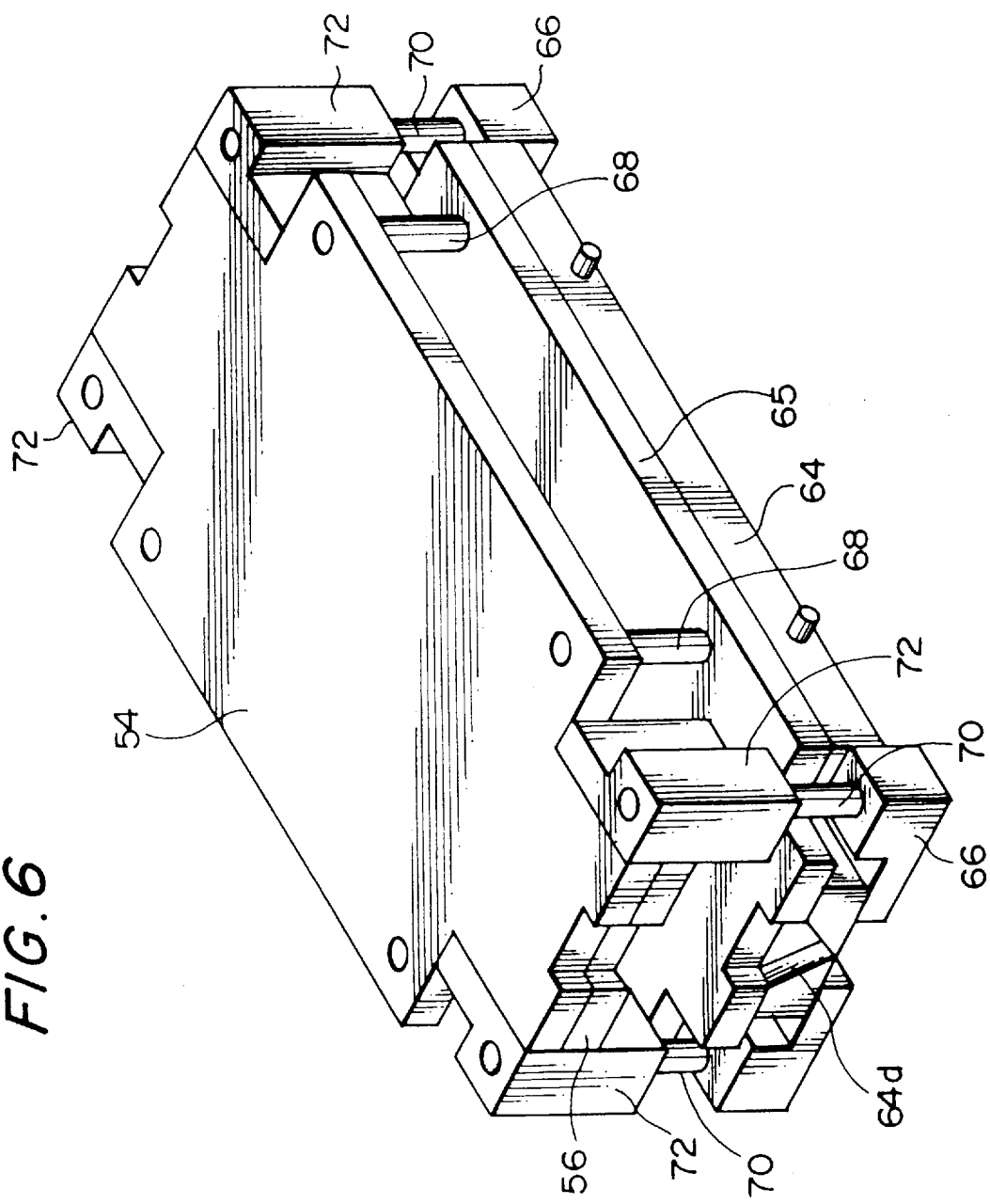
FIG. 6 is a perspective view showing the mold-released state of an injection core mold when a neck presser plate has been lowered.
Figure 8:
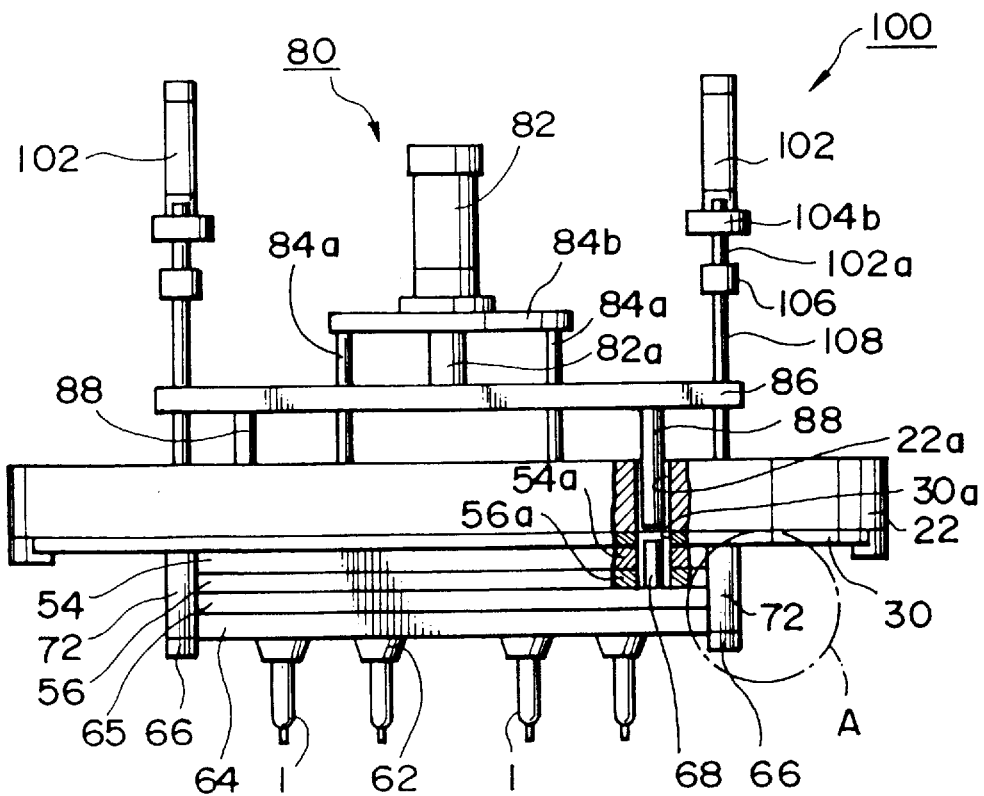
FIG. 8 is a view illustrating a preform ejecting drive mechanism.
Figure 9:
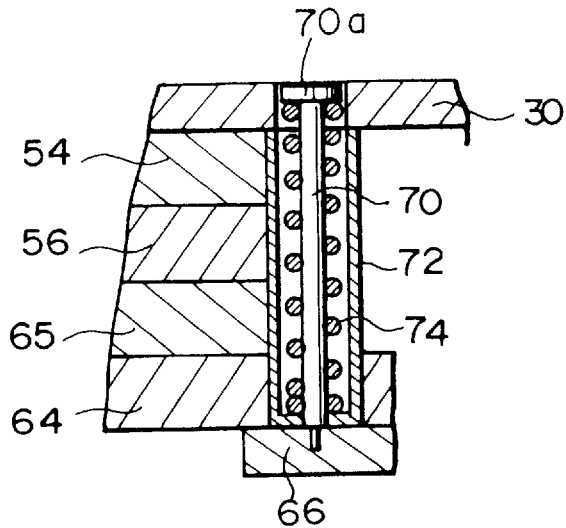
FIG. 9 is an enlarged sectional view of portion A in FIG. 8.

As shown in FIG. 9, which is an enlarged sectional view of portion A of FIG. 8, and in FIG. 6, at each end of each guide plate 66 a vertical lifting and lowering pin 70 has its lower end fixed in the guide plate 66, and a flange 70a is formed at the upper end of this lifting and lowering pin 70. A guide cylinder 72 extends downward from the underside of the rotary disc 30, and the lifting and lowering pin 70 is disposed inside this guide cylinder 72. A return spring 74 is disposed between the inner wall of the bottom portion of the guide cylinder 72 and the flange 70a of the lifting and lowering pin 70. The upward urging force of these return springs 74 urges the guide plate 66 upward at all times, and as a result the neck presser plate 65 is normally in contact with the underside of the core fixing plate 56.

By this state of contact between the core fixing plate 56 and the neck presser plate 65 being maintained, the injection core mold 50 and the neck cavity mold 60 are kept clamped together. When in the preform ejecting section 16 an external force (which will be further discussed later) is applied to the lifting and lowering pins 70, the lifting and lowering pins 70 descend against the urging force of the return springs 74 and the neck presser plate 65 is driven down so that it moves away from the underside of the core fixing plate 56 and pushes the neck fixing plate 64 downward. As a result, the core pins 52 of the injection core mold 50 are released from the preforms 1 whose neck portions 2 are held by the neck cavity mold 60.

Preform Ejecting Section 16

Next, the construction of the preform ejecting section 16, and in particular the preform ejection drive mechanism will be described. In this preferred embodiment, the preform ejection drive mechanism is made up of a neck mold-release driver 80 and a split mold opening driver 100. As shown in FIG. 8, the neck mold-release driver 80 has a first cylinder 82, and this first cylinder 82 is mounted on a first cylinder mounting plate 84b supported on the upper clamping plate 22 by way of first support rods 84a. The first cylinder 82 drives a first raising and lowering plate 86 up and down by way of a first piston rod 82a. Presser drive rods 88 are provided at each end of this first raising and lowering plate 86. Holes 22a are provided in the upper clamping plate 22 passing through from the upper surface to the lower surface thereof, and the presser drive rods 88 are disposed in these holes 22a. The initial position of the first raising and lowering plate 86 is a position such that the ends of the presser drive rods 88 do not project below the underside of the upper clamping plate 22 so they do not obstruct the rotation of the rotary disc 30.

As shown in FIG. 8, the rotary disc 30, the core presser plate 54 and the core fixing plate 56 respectively have holes 30a, 54a and 56a in positions facing the holes 22a in the upper clamping plate 22. Driven rods 68 disposed in the holes 30a, 54a and 56a are mounted on the upper surface of the neck presser plate 65.

Figure 10:
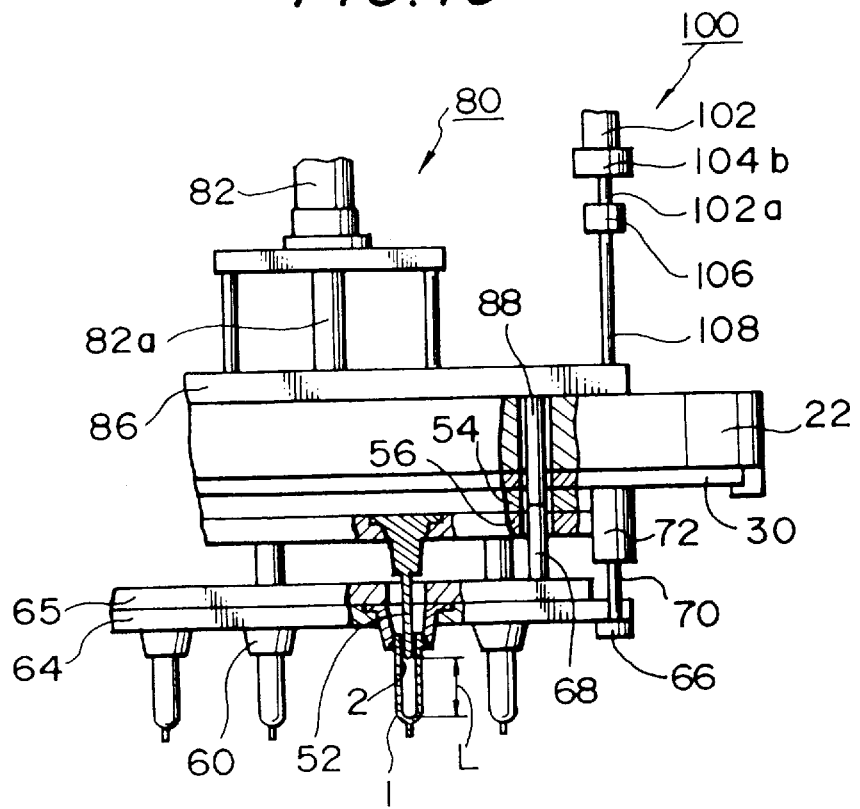
FIG. 10 is a partially sectional view illustrating the mold-released state of the injection core mold.

As a result, when the first cylinder 82 is driven, the neck presser plate 65 and the neck fixing plate 64 are driven down against the urging force of the return springs 74 by the first cylinder 82 by way of the first piston rod 82a, the presser drive rods 88 and the driven rods 68. As shown in FIG. 10, this causes the core pins 52 of the injection core mold 50 to release from the preforms 1 whose neck portions 2 are held by the neck cavity mold 60. In this preferred embodiment, the core pins 52 of the injection core mold 50 do not have to be pulled completely clear of the open ends of the preforms 1, it only being necessary that at least gaps through which air can enter form between the core pins 52 and the inner walls of the preforms 1. In this preferred embodiment, the downward stroke of the neck fixing plate 64, that is the releasing stroke of the core pins 52 (the length L shown in FIG. 10), is set at for example 50 mm.

Next, the split mold opening driver 100 will be described. As shown in FIG. 1 and FIG. 8, this split mold opening driver 100 has for example two second cylinders 102. These second cylinders 102, as shown in FIG. 11, are mounted on a second cylinder mounting plate 104b supported on the first raising and lowering plate 86 by way of second support rods 104a. As a result, when the first raising and lowering plate 86 is driven up or down by the first cylinder 82, the second cylinders 102 are also moved up or down at the same time. These second cylinders 102 drive second raising and lowering plates 106 up and down by way of second piston rods 102a. The split plate opening cams 108 are mounted on these second raising and lowering plates 106. The lower end portions of these split plate opening cams 108 are of a wedge shape fitting the wedge holes 64d formed in the split plates 64a and 64b constituting the neck fixing plate 64. By driving the second cylinders 102 the split plate opening cams 108 are driven down and the wedge portions at their ends are thereby inserted into the wedge holes 64d in the neck fixing plate 64, and this opens the split plates 64a and 64b. Consequently the pairs of split molds 62a and 62b mounted on this pair of split plates 64a and 64b are opened, and the preforms 1 are ejected from the neck cavity mold 60. In this preferred embodiment the drive timing of the second cylinders 102 is set to after the first cylinder 82 is driven.

Next, the operation of the preform molding station 10 of the apparatus of the preferred embodiment will be described.

Injection Molding in Injection Molding Section 14

The clamping cylinder 28 is driven and the upper clamping plate 22 is thereby driven down, whereby the injection core mold 50 and the neck cavity mold 60 are clamped to the injection cavity mold 42. After the clamped state shown in FIG. 4 is reached, by a screw inside the injecting apparatus 12 being advanced and rotated, the preforms 1 injection molding material, for example polyethylene terephthalate (PET), is injected by way of the hot runner mold 40 into the cavity bounded by the molds 42, 50 and 60, and the preforms 1 are thereby injection molded.

Cooling Step in Injection Molding Section 14

The injection cavity mold 42, the injection core mold 50 and the neck cavity mold 60 each have a coolant, for example water at room temperature, circulating through them, and the resin injected into the cavity bounded by the molds can be immediately cooled.

Injection Cavity Mold 42 Mold-Release Step in Injection Molding Section 14

By the clamping cylinder 28 being so driven that it lifts the upper clamping plate 22, the injection core mold 50 and the neck cavity mold 60 can be lifted up away from the injection cavity mold 42 as shown by the mold-open state of FIG. 10. At this time, because the neck portions 2 of the preforms 1 form an undercut with respect to the mold-release direction, the injection molded preforms 1 are held on the injection core mold 50 and neck cavity mold 60 side and are released from the injection cavity mold 42.

The timing at which this mold-release starts in the injection molding section 14 can be made considerably earlier than a conventional mold-release starting timing. In other words, the cooling time of the preforms 1 in the injection molding section 14 can be shortened. This is because even after the preforms 1 have been released from the injection cavity mold 42 the core pins 52 of the injection core mold 50 remain inside the preforms 1 and deformation of the preforms 1 accompanying their thermal contraction can be prevented. Therefore, the mold-release temperature of the preforms 1 in the injection molding section 14 only has to be low enough for a skin layer thick enough for the shape of the preforms 1 to be maintained after they are released from the injection cavity mold 42 to form at the outer surfaces of the preforms 1, and can be higher than conventional mold-release temperatures. Even if the mold-release temperature is high like this, because the cooling causes the preforms 1 to contract around the core pins 52 of the injection core mold 50, mold-release from the injection cavity mold 42 can be carried out relatively smoothly, and preform 1 mold-release problems do not occur. Also, because in the injection molding section 14 withdrawal of the core pins 52 is not carried out, even if the preforms 1 are mold-released at a high mold-release temperature, the mold-release problem of the lower ends of the preforms 1 being lifted together with the core pins 52 does not occur.

The clamped state of the injection core mold 50 and the neck cavity mold 60 with respect to the preforms 1 released from the injection cavity mold 42 is maintained by the core fixing plate 56 and the neck presser plate 65 being kept in contact with each other by the return springs 74. This clamped state of the injection core mold 50 and the neck cavity mold 60 is maintained through the subsequent preforms 1 carrying step and until in the preform ejecting section 16 the injection core mold 50 is released from the preforms 1. Cooling of the preforms 1 is possible throughout the time during which this clamped state of the injection core mold 50 and the neck cavity mold 60 is maintained.

Preforms 1 Carrying Step

The preforms 1 are carried from the injection molding section 14 to the preform ejecting section 16 by the rotary actuator 32 being driven and the rotary disc 30 constituting the first circulatory carrier being rotated thereby through 180°. During this preforms 1 carrying step, it is possible for cooling of the preforms 1 by the coolant circulating through the injection core mold 50 and the neck cavity mold 60 to continue without interruption.

Generally, when the preforms 1 are mold-released at a high temperature, crystallization occurs due to inadequate cooling and the wall surfaces of the preforms 1 become nontransparent, and particularly when PET is being used to make transparent containers this is a fatal defect. According to experiments carried out by the present inventors, this crystallization and loss of transparency of the preforms 1 accompanying inadequate cooling is particularly marked at the inner wall sides of the preforms 1. This is because at the inner wall side of a preform 1 there is less surface area in contact with the mold and consequently the inner wall is more liable to be inadequately cooled than the outer wall. Also, when as in the past the injection cavity mold 42 and the injection core mold 50 are released from the preforms 1 in the injection molding section, the inner wall side is more liable to be inadequately cooled than the outer wall because the heat-radiating surface area at the inner wall side of the preform 1 is smaller than at the outer wall side and furthermore heat is confined in the interior of the preform 1.

In this preferred embodiment, even if in the injection molding portion 14 the preforms 1 are mold-released at a relatively high temperature, in the subsequent carrying step it is possible for the preforms 1 to continue to be cooled by the injection core mold 50 and the neck cavity mold 60. In particular, because the inner walls of the preforms 1 can be uninterruptedly cooled by the core pins 52 of the injection core mold 50, crystallization and loss of transparency caused by inadequate cooling can be certainly prevented. Also, the neck portions 2, which because they are thick have large heat capacities and are more liable to crystallize than other portions, can be cooled by the neck cavity mold 60 and prevented from crystallizing.

Preform Cooling Step in Preform Electing Section 16

Even after the preforms 1 have been carried into the preform ejecting section 16, by the clamped state of the injection core mold 50 and the neck cavity mold 60 with respect to the preforms 1 being maintained, the preforms 1 can be cooled as they were during the above-mentioned carrying step. At this time, even if in the injection molding section 14 the clamping cylinder 28 has been driven and the upper clamping plate 22 lowered for the injection molding of the next preforms, because the above-mentioned clamped state in the preform ejecting section 16 is maintained, cooling of the preforms 1 can be continued.

Separation of Neck Cavity Mold 60 from Injection Core Mold 50

Cooling of the preforms 1 by the core pins 52 of the injection core mold 50 only has to continue long enough for crystallization caused by inadequate cooling of the inner walls of the preforms 1 to be prevented and for deformation of the ejected preforms 1 to be avoided, and indeed if the preforms 1 are excessively cooled by the core pins 52, removal of the core pins 52 becomes difficult. Therefore, in this preform ejecting section 16, first the injection core mold 50 is released from the preforms 1. In this preferred embodiment, this is achieved by the neck cavity mold 60 holding the preforms 1 being released from the injection core mold 50.

This separation of the neck cavity mold 60 is carried out by the neck presser plate 65 kept in contact with the core fixing plate 56 by the urging force of the return springs 74 being lowered by the neck mold-release driver 80. When the first cylinder 82 of the neck mold-release driver 80 is driven, the pushing force thereof transmitted through the first piston rod 82a, the first raising and lowering plate 86, the presser drive rods 88 and the driven rods 68 causes the neck fixing plate 64 to be pressed against the neck presser plate 65 and be driven downward as shown in FIG. 6 and FIG. 10. At this time, because the preforms 1 have their neck portions 2 held by the neck cavity mold 60, the preforms 1 are also driven downward together with the neck fixing plate 64 and the neck cavity mold 60. Consequently, the separation of the neck cavity mold 60 from the injection core mold 50 results in the injection core mold 50 being released from the preforms 1.

This mold-releasing stroke of the injection core mold 50 with respect to the preforms 1 does not have to be so long that the core pins 52 are pulled completely clear of the open ends of the preforms 1 for the subsequent carrying of the preforms 1 as it does conventionally, and need only be long enough for at least gaps through which air can enter to be formed between the inner walls of the preforms 1 and the core pins 52. Consequently, the mold-releasing stroke of the injection core mold 50 depends on the angle of the removal taper provided on the core pins 52 and the inner walls of the preforms.1, and the greater this removal taper angle is, the shorter the mold-release stroke need be. Because the mold-releasing stroke of the injection core mold 50 can be shortened in this way the installation height of the first cylinder 82 can be made low and the overall height of the injection molding apparatus can be made low, and this is advantageous in the transportation and installation of the apparatus.

Preforms 1 Ejection Step in Preform Ejecting Section 16

Because the preforms 1 have their neck portions 2 held by the neck cavity mold 60 comprising the pairs of split molds 62a and 62b, the preforms 1 can be ejected by this neck cavity mold 60 being released. To bring this about, the second cylinders 102 of the split mold opening driver 100 are driven. This driving force of the second cylinders 102 is transmitted to the split plate opening cams 108 by way of the second piston rods 102a and the second raising and lowering plates 106. By the split plate opening cams 108 being driven downward, as shown in FIG. 11 their ends are inserted into the wedge holes 64d formed in the split plates 64a and 64b, these split plates 64a and 64b are driven open, and the pairs of split molds 62a and 62b are thereby opened. At this time, even if a neck portion 2 of a preform 1 has stuck to one of the split molds 62a, 62b and tries to move therewith, because the respective core pin 52 of the injection core mold 50 is still inside the preform 1, lateral movement of the preform 1 is restricted and the preform 1 can be dropped downward without fail.

In the state before the split plate opening cams 108 are driven downward, in order to avoid the split plate opening cams 108 interfering with the rotation of the rotary disc 30 it is necessary that their ends stop within the thickness of the upper clamping plate 22. On the other hand, because the neck fixing plate 64 which is driven open by these split plate opening cams 108 is in the farthest position from the rotary disc 30, the downward stroke of the split plate opening cams 108 is long. In this preferred embodiment, because the second cylinders 102 which drive these split plate opening cams 108 are mounted on the first raising and lowering plate 86 driven by the first cylinder 82 and because before the split plate opening cams 108 are driven the first raising and lowering plate 86 is driven, the actual downward stroke through which the split plate opening cams 108 are driven by the second cylinders 102 is short. As a result, the installation height of the second cylinders 102 can be made low, the overall height of the injection molding apparatus an be made low, and an apparatus advantageous from the points of view of transportation and installation can be provided.

After this preform 1 ejecting step is finished, the first and second cylinders 82 and 102 return to their original states. As a result, the neck presser plate 65 is brought back into contact with the core fixing plate 56 by the return springs 74, and the injection core mold 50 and the neck cavity mold 60 are returned to their clamped state in preparation for the next injection molding.

The cooling and mold-releasing steps described above carried out in the preform ejecting section 16 only have to be finished within the time taken for the injection molding of the next, new preforms in the injection molding section 14 to finish, in other words within the injection molding cycle time. The preform 1 cooling time depends particularly on the thickness of the trunk portions of the preforms 1, and the thicker the preforms 1 are the longer the cooling time that must be provided. In this preferred embodiment this cooling time can be adjusted by way of the setting of the timing of the mold-release of the injection core mold 50 in the preform ejecting section 16 as well as by adjusting the cooling time in the injection molding section 14. As a result, even while the mold-release temperature in the injection molding section 14 is made high and the injection molding cycle time thereby shortened, because adjustment of the cooling time is easy a highly flexible preform injection molding station can be provided.

After the preform 1 injection molding in the injection molding section 14 is finished, the injection core molds 50 and the neck cavity molds 60 in the two sections 14 and 16 are changed around by the rotary disc 30 being rotated through 180° by the rotary actuator 32. In this preferred embodiment, the rotary actuator 32 consists of reversible rotary carrying means of which the rotary carrying direction reverses each time. As a result, even if the injection core molds 50 and the neck cavity molds 60 rotationally carried have cooling pipes for circulating coolant therethrough connected thereto, these cooling pipes will not be twisted through more than one revolution. Consequently, it is possible to connect these cooling pipes to the molds without using rotary connectors and their construction does not become complicated.

Because for the reasons discussed above the preforms 1 are given a uniform temperature or a suitable temperature distribution, it is possible to mold bottles of a desired thickness. Also, because whitening crystallization of the bottles is prevented, highly transparent bottles can be molded. This invention is not limited to being applied to the hot parison blow molding described above, and of course can also be applied to so-called cold parison blow molding wherein the preforms are returned to room temperature before being heated again and blow molded. In this case also, there is the effect that the injection molding cycle time can be shortened.

Transfer Station 200

Figure 21:
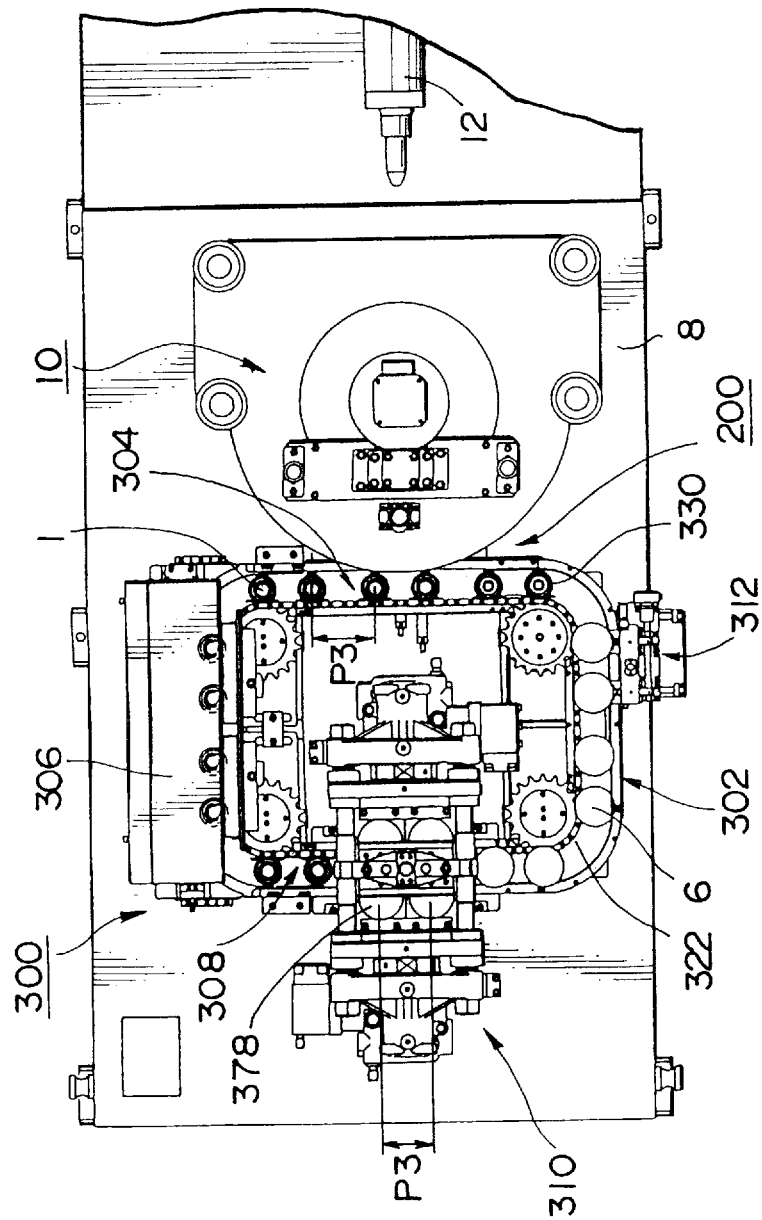
FIG. 21 is a plan view showing another preferred embodiment apparatus of the invention wherein the numbers of preforms molded simultaneously are different from those of the apparatus of FIG. 1.

Next, the constitution and operation of the transfer station 200 will be described with reference to FIG. 2, FIG. 12 to FIG. 14 and FIG. 21 and FIG. 22. FIG. 12 to FIG. 15 show a mechanism corresponding not to the preferred embodiment apparatus shown in FIG. 1 but rather corresponding to a preferred embodiment apparatus shown in FIG. 21. FIG. 21 shows a case wherein the above-mentioned numbers N and n of preforms molded simultaneously are respectively N=6 and n=2, and accordingly the mechanisms of the transfer station 200 shown in FIG. 12 to FIG. 15 transfer n=2 preforms 1 simultaneously. The case wherein n=1 preform 1 is transferred at a time is exactly the same as the case where n=2 except in that there is no transfer pitch conversion, which will be further discussed later.

This transfer station 200 has a receiving and lowering mechanism 210 which receives and lowers preforms 1 ejected from the preform ejecting section 16 of the preform molding station 10, and an inverting and handing over mechanism 230 which then turns the preforms 1 upside-down and hands them over to the preform receiving section 304 of the blow molding station 300.

Receiving and Lowering Mechanism 210

Figure 12:
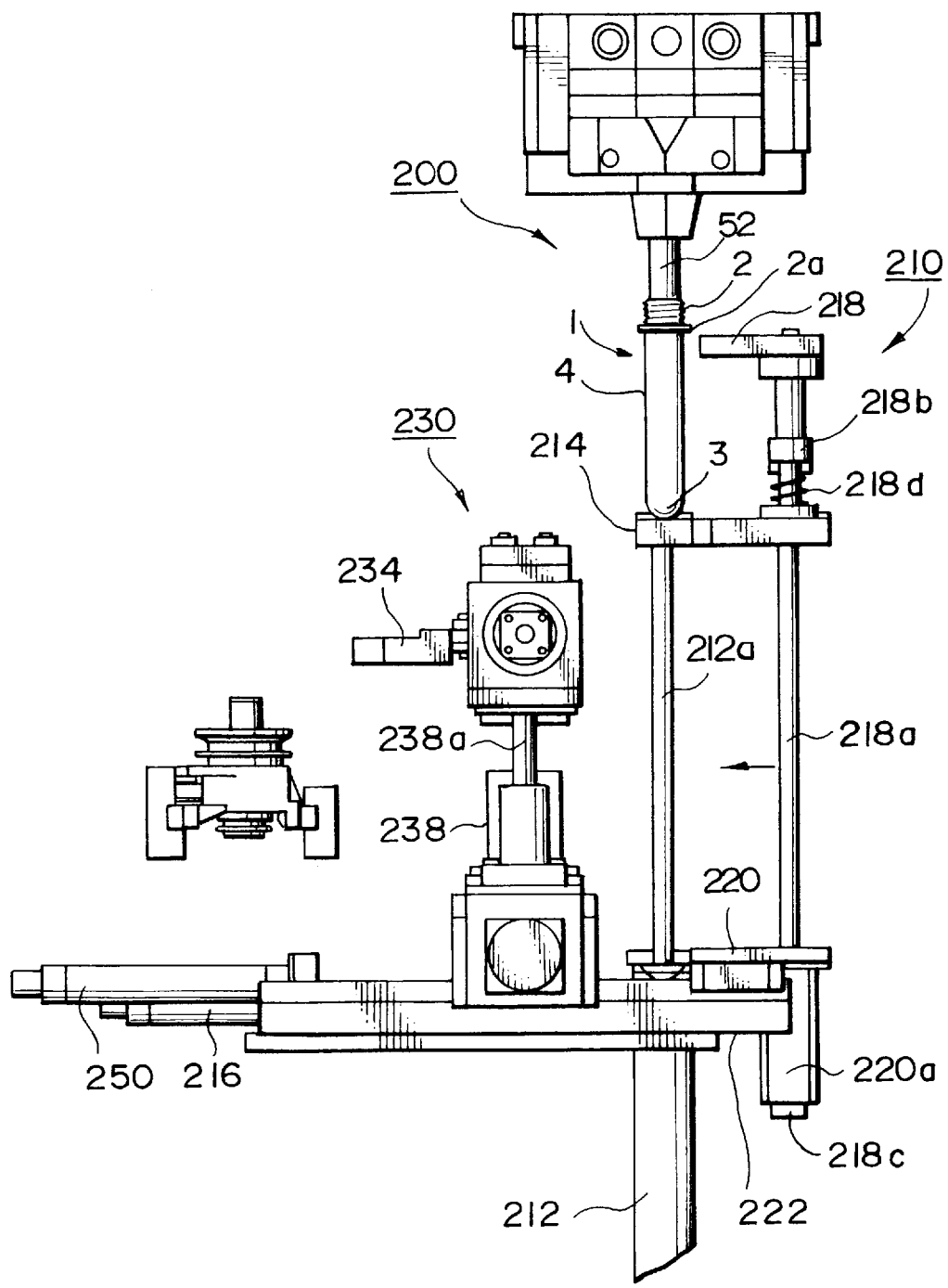
FIG. 12 is a view illustrating the operation of a transfer station receiving a preform.
Figure 13:
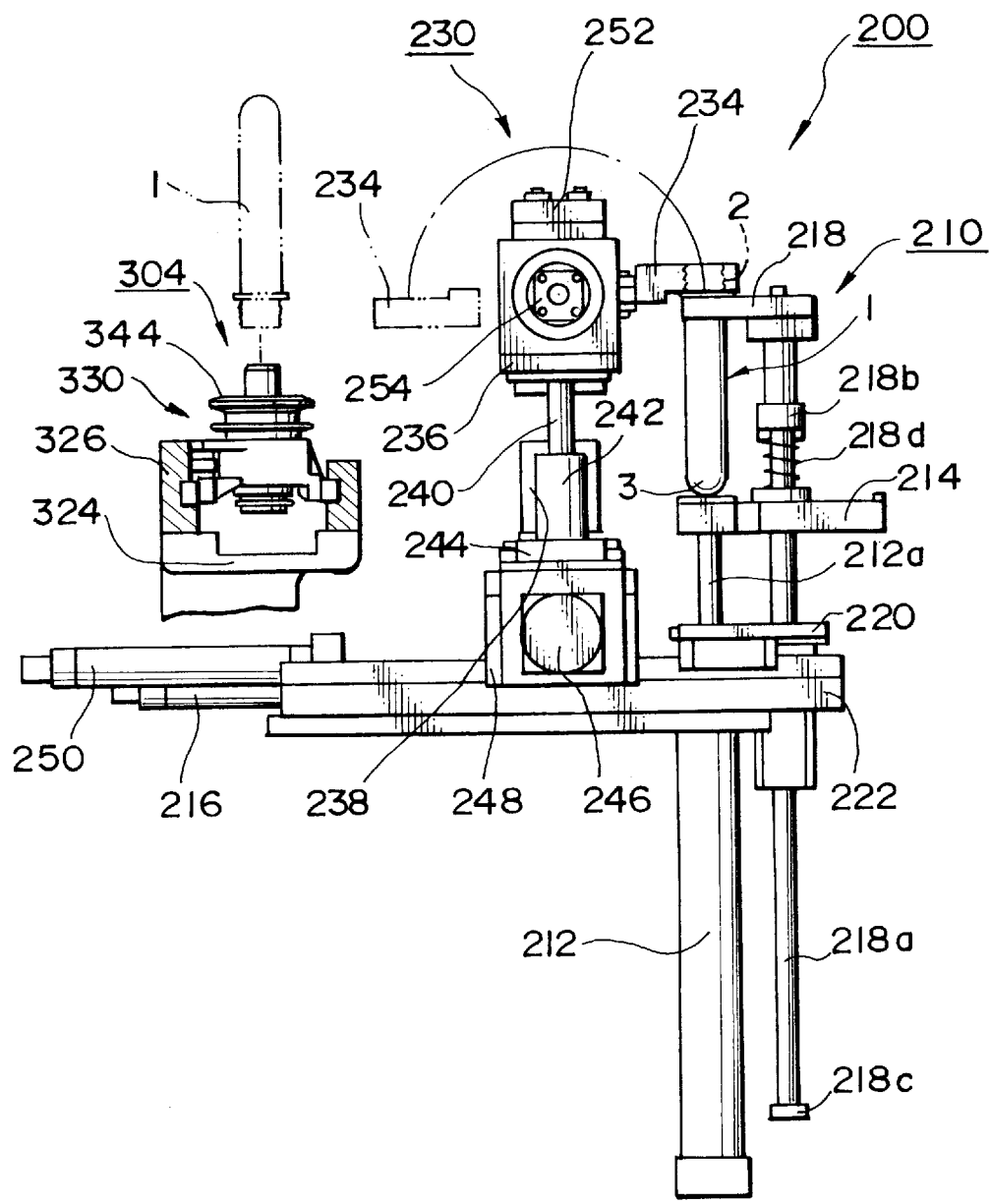
FIG. 13 is a view illustrating the operation of a transfer station handing a preform over to a blow molding station.

FIG. 12 and FIG. 13 respectively show the receiving and lowering mechanism 210 in a raised position and a lowered position. This receiving and lowering mechanism 210 has a bottom portion holding part 214 which holds the bottom portion 3 of a preform 1 and a neck lower portion holding part 218 which supports a support ring 2a formed at the lower end of the neck portion 2 of the preform 1. The bottom portion holding part 214 is mounted on a rod 212a of a first raising and lowering drive device 212 comprising an air cylinder or the like and is movable up and down between the raised position in which it is shown in FIG. 12 and the lowered position in which it is shown in FIG. 13. This vertical stroke b is shown in FIG. 4.

The neck lower portion holding part 218 is movable up and down together with the bottom portion holding part 214 and is movable horizontally through a horizontal stroke a shown in FIG. 4. To make this possible, a first slider 220 is disposed on a rail 222 slidably therealong. This first slider 220 is driven horizontally by a rod 216a of a first advancing and withdrawing drive device 216 comprising an air cylinder or the like. The neck lower portion holding part 218 has a small diameter shaft portion 218a at its lower part and a large diameter shaft portion 218b at its upper part, and the small diameter shaft portion 218a passes through a stopper member 220a mounted on the first slider 220. A flange 218c is fixed to the lower end of the small diameter shaft portion 218a which projects below this stopper member 220a. Also, a spring 218d is disposed around a portion of the small diameter shaft portion 218a projecting upward of the bottom portion holding part 214. Because this spring 218d is disposed between the bottom portion holding part 214 and the large diameter shaft portion 218b, the large diameter shaft portion 218b is pushed upward by the spring 218d as the bottom portion holding part 214 ascends, and the neck lower portion holding part 218 can thereby be raised. When the first advancing and withdrawing drive device 216 is driven, because this horizontal driving force is transmitted by way of the first slider 220 to the shaft portions 218a and 218b, the neck lower portion holding part 218 is caused to slide horizontally. This sliding stroke a is shown in FIG. 4.

The operation of this receiving and lowering mechanism 210 will now be explained with reference to FIG. 4, FIG. 12 and FIG. 13. Before the neck cavity mold 60 is driven open in the preform ejecting section 16 of the preform molding station 10, the bottom portion holding part 214 and the neck lower portion holding part 218 are disposed in the positions in which they are shown in FIG. 12. In this state shown in FIG. 12, the raised position of the neck lower portion holding part 218 is determined by the flange 218c thereof abutting with the stopper member 220a. The bottom portion holding part 214 is stopped in a position which it reaches by compressing the spring 218d after the neck lower portion holding part 218 has reached its upper limit position. At this time, the neck lower portion holding part 218 is in a position wherein it is withdrawn to the right in FIG. 4 and FIG. 12 of a position directly below the support ring 2a of the preform 1. When the neck cavity mold 60 is driven open, the preform 1 drops downward and its bottom portion 3 is caught by the bottom portion holding part 214. At this time, as shown in FIG. 12, the preform 1 does not completely release from the core pin 52 and the preform 1 maintains an upright state with a portion of the core pin 52 remaining inserted therein.

After that the first advancing and withdrawing drive device 216 is driven, and the neck lower portion holding part 218 is moved to the left through the stroke a (see FIG. 4). As a result, the neck lower portion holding part 218 is positioned directly below the support ring 2a of the preform 1.

After that, the first raising and lowering drive device 212 is so driven that it pulls in the rod 212a, and the bottom portion holding part 214 starts to be lowered. In the initial stage of this lowering, until the spring 218d returns to its original length, the neck lower portion holding part 218 stays in its upper position. As a result, during the initial stage of this lowering, the bottom portion holding part 214 moves away from the bottom portion 3 of the preform 1 and the support ring 2a of the preform 1 comes to rest on the neck lower portion holding part 218. The first raising and lowering drive device 212 continues to be driven after this, and the preform 1 descends with its support ring 2a being held by the neck lower portion holding part 218 only. It is preferable that members of low thermal conductivity, for example synthetic resin or the like, be used for the portions of the bottom portion holding part 214 and the neck lower portion holding part 218 which make contact with the preform 1. The preform 1 supported by the neck lower portion holding part 218 continues to be lowered until it reaches the position in which it is shown in FIG. 13.

Inverting and Handing Over Mechanism 230

Figure 14:
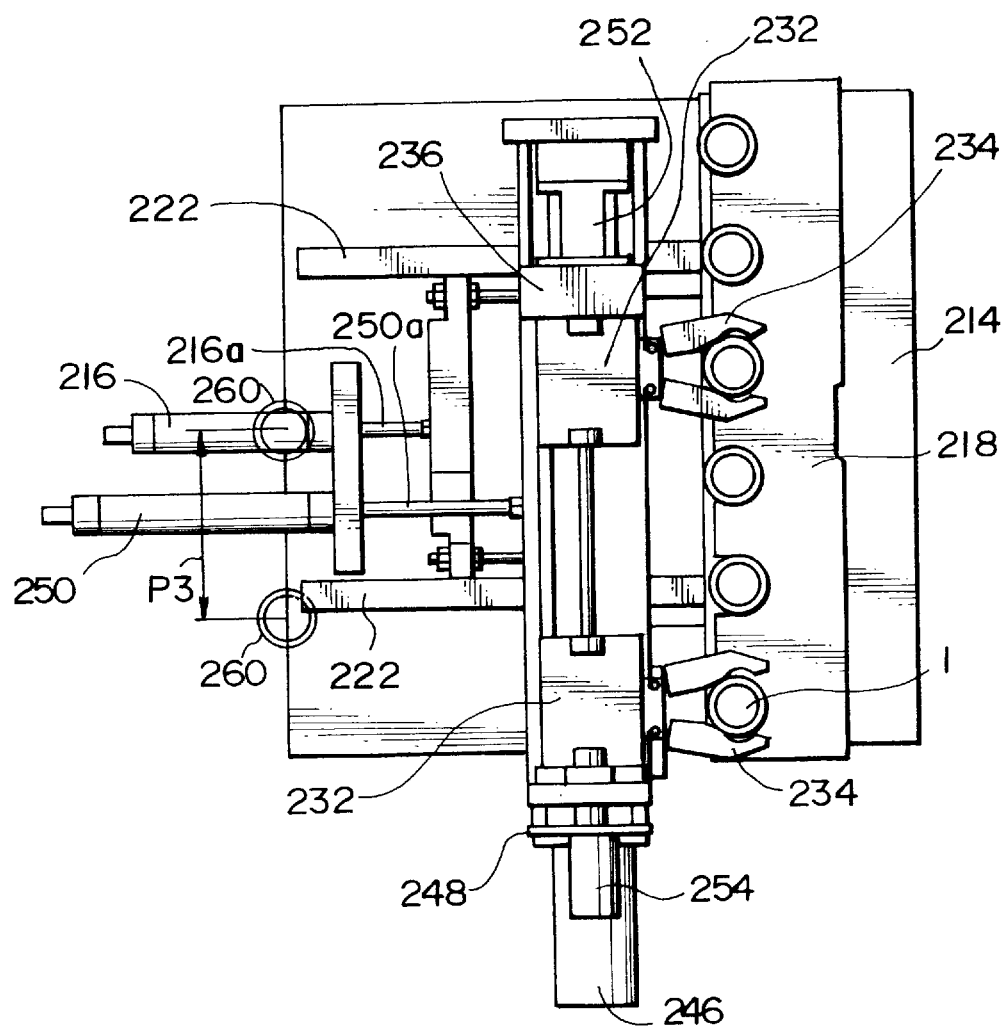
FIG. 14 is a plan view of the transfer station.
Figure 15:
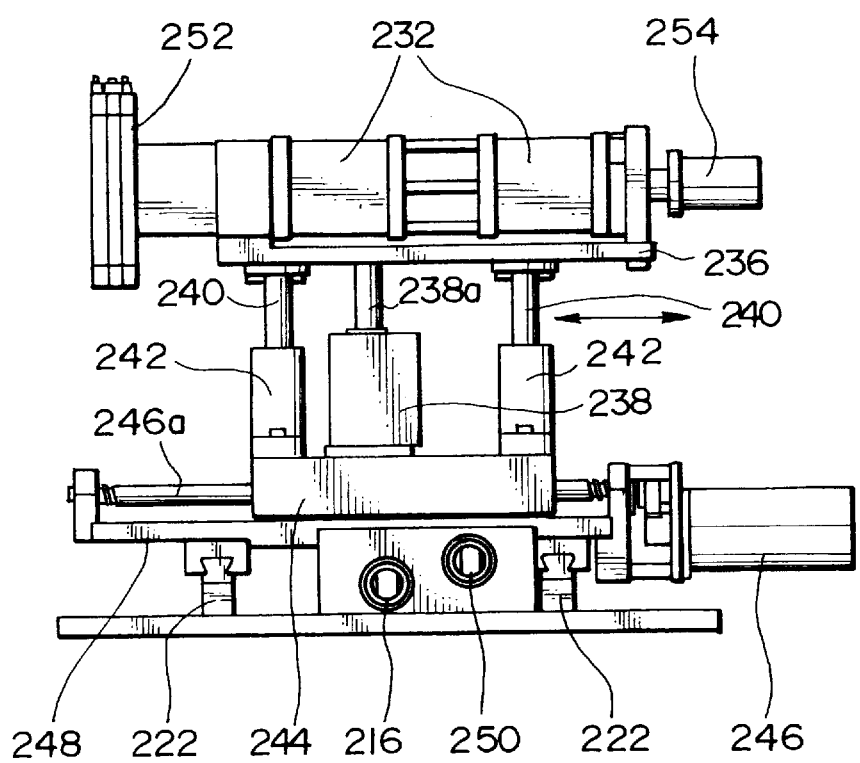
FIG. 15 is a side view of the transfer station.

Next, the constitution of the inverting and handing over mechanism 230 will be described with reference to FIG. 4 and FIG. 13 to FIG. 15. This inverting and handing over mechanism 230 has two neck holding mechanisms 232 corresponding to the number n=2 of preforms simultaneously blow molded in the blow molding section 310 shown in FIG. 21 (see FIG. 14). The neck holding mechanisms 232 each have an open/closeable pair of neck holding members 234 which hold the neck portion 2 of the preform 1. As shown in FIG. 15, these two neck holding mechanisms 232 are mounted on a support table 236, and this support table 236 is linked to a rod 238a of a second raising and lowering drive device 238 comprising and air cylinder or the like. As a result, the two neck holding mechanisms 232 are movable vertically through a vertical stroke e shown in FIG. 4. In order to make this vertical movement smooth, for example two guide rods 240 are provided and guided by guide portions 242.

The second raising and lowering drive device 238 and the guide portions 242 described above are mounted on a second slider 244 as shown in FIG. 15. This second slider 244 is provided with a horizontal drive device 246 which moves the second slider 244 in the direction in which the number of preforms N, for example 4, simultaneously molded in the injection molding section 14 are arrayed. This horizontal drive device 246 moves the second slider 244 horizontally by means of for example a ball screw 246*a*. The horizontal drive device 246 is mounted on a third slider 248, and this third slider 248 is provided with a second advancing and withdrawing drive device 250 which advances and withdraws the raising and lowering drive device 238 through the advancing and withdrawing stroke c shown in FIG. 4. That is, as shown in FIG. 14, a rod 250*a* of the second advancing and withdrawing drive device 250 is linked to the third slider 248.

Also, there is provided an inverting drive device 252 which rotates the two neck holding mechanisms 232 through 180° about a horizontal axis. The 180° rotational stroke d of this inverting drive device 252 is shown in FIG. 4. As a result of this inversion the preform 1 moves from an upright state wherein the neck portion 2 faces upward to an inverted state wherein the neck portion 2 faces downward.

Next, the operation of this inverting and handing over mechanism 230 will be explained. When the preforms 1 reach their lowered positions as shown in FIG. 13, the neck holding mechanisms 232 which are in a standby position shown with chain lines in FIG. 13 are rotated through 180° by the inverting drive device 252. Opening and closing drive mechanisms incorporated into the neck holding mechanisms 232 close the pairs of neck holding members 234, and the neck portions 2 of the preforms 1 are held by these neck holding members 234. Then the preforms 1 are inverted. Before that, however, to prevent the preforms 1 from interfering with other members, the neck lower portion holding part 218 is withdrawn to the right through the moving stroke a (see FIG. 4), and by the third slider 248 being moved to the left through the moving stroke c (see FIG. 4) the two neck holding mechanisms 232 are moved to the left. After that, by the preforms 1 being rotated through 180° by the inverting drive device 252, the preforms 1 reach the position shown with chain lines in FIG. 13. Then, by the two neck holding mechanisms 232 being lowered by the second raising and lowering drive device 238 through the stroke e (see FIG. 4), the preforms 1 can be placed on carrier members 330 positioned in the preform receiving section 304 of the blow molding station 300. After that, the neck holding mechanisms 232 are opened and moved through the vertical stroke e and the transverse stoke c shown in FIG. 4 whereby the neck holding mechanisms 232 are moved away from the preforms 1 and returned to their standby position shown with chain lines in FIG. 13.

When the above transfer operation is carried out in the preferred embodiment apparatus shown in FIG. 21 wherein the number of simultaneously blow molded preforms 1 is n=2, n=2 preforms 1 are transferred simultaneously. The transferred two preforms 1 are handed over to carrier members 330 in two receiving positions 260. At this time, the pitch P2 at which the neck holding mechanisms 232 receive the two preforms 1 from the receiving and lowering mechanism 210 is different from the pitch P3 at which the neck holding mechanisms 232 deliver the two preforms 1 to the carrier members 330. This is because during the transfer of the preforms 1 pitch conversion is performed by a pitch change drive device 254; this point will be further discussed later. In the case of the preferred embodiment apparatus of FIG. 1 wherein the number of preforms 1 simultaneously blow molded is n=1, the preform 1 is delivered to a carrier member 330 positioned between the two receiving positions shown in FIG. 14. Therefore, each time an injection molding operation in which N=4 simultaneously injection molded preforms 1 are injection molded is finished, transfer of one preform 1 at a time is repeated four times.

Blow Molding Station 300

Next, the blow molding station 300 will be described with reference to 41, FIG. 4 and FIG. 16 to FIG. 20.

Second Circulatory Carrier 302 and Preform Receiving Section 304

This blow molding station 300 circulates the carrier member 330 carried by the second circulatory carrier 302 in order through the preform receiving section 304, the heating section 306, the standby section 308, the blow molding section 310 and the bottle ejecting section 312. As shown in FIG. 1, the second circulatory carrier 302 has four sprockets 320*a* to 320*d*, and for example only the sprocket 320*a* is driven and the other sprockets 320*b* to 320*d* are not driven. An endless carrier chain 322 runs around these four sprockets 320*a* to 320*d*. Some other endless drive member, such as a belt, for example a V-belt or a toothed belt, can be used instead of the chain, and other rotary drive members such as pulleys can be used instead of the sprockets.

Figure 18:
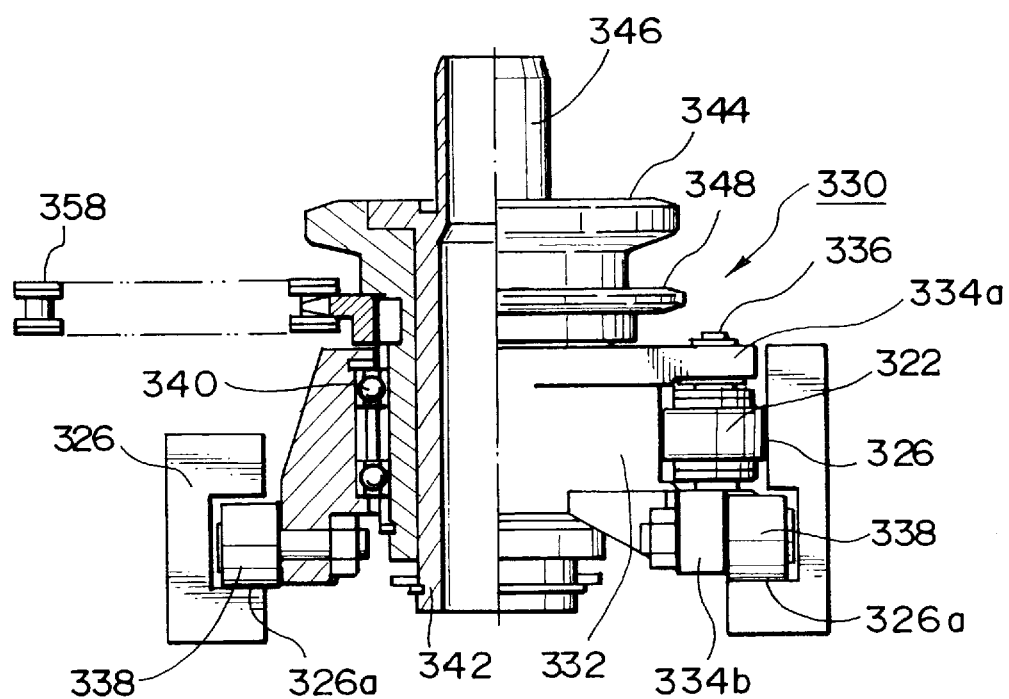
FIG. 18 is a partially cut-away front view of the carrier member shown in FIG. 16.

In the preferred embodiment apparatus shown in FIG. 1, ten carrier members 330 are fixed to the carrier chain 322. This fixing structure is as follows:

As shown in FIG. 18, each carrier member 330 has a cylindrical mount portion 332. This mount portion 332 has is provided at one side thereof with projecting portions 334*a* and 334*b* which respectively project above and below the carrier chain 322, sandwiching the carrier chain 322. Adjacent chain links in the carrier chain 322 are connected by hollow pins, and the upper and lower projecting portions 334*a* and 334*b* are linked to the carrier chain 322 by fixing pins 336 being passed through the central portions of the hollow pins and having their ends secured so that they cannot drop out.

A cylinder 342 is rotatably supported by way of a bearing 340 inside the cylindrical portion of the mount part 332. The upper portion of this cylinder 342 functions as a carrying surface 344 on which the end surface of the neck portion 2 of an inverted preform 1 is placed. Also, a carrying pin 346 is supported inside this cylinder 342. This carrying pin 346 has a portion thereof projecting upward of the carrying surface 344 which enters the neck portion 2 of the preform 1 and can support the preform 1 in its inverted state. Thus, the carrying surface 344 and the carrying pin 346 constitute a preform 1 supporting portion.

Figure 16:
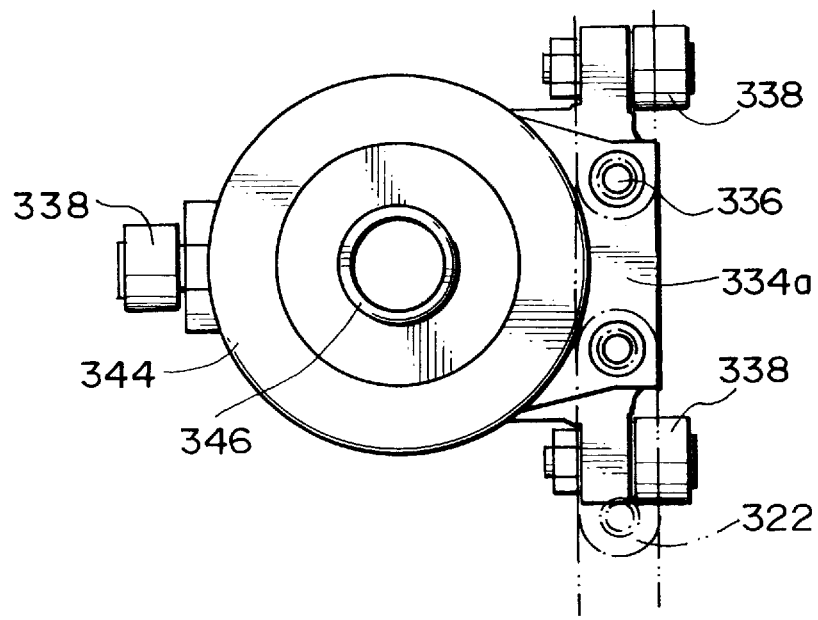
FIG. 16 is a plan view of a carrier member of a second circulatory carrier provided in the blow molding station.
Figure 17:
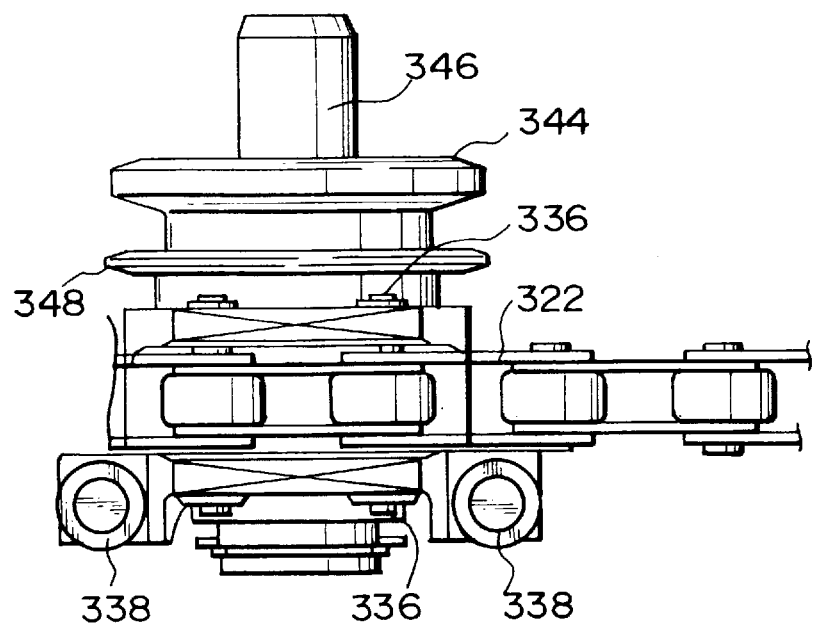
FIG. 17 is a side view of the carrier member shown in FIG. 16.

As shown in FIG. 16, three cam followers 338 consisting of rollers or the like are supported on this carrier member 330. Two of the cam followers 338 roll along the inner side locus described when the carrier member 330 is driven by the carrier chain 322. The other cam follower 338 rolls along the outer side locus. These three cam followers 338 are guided by a carrier base 324 or by rails 326, depending on where the carrier member 330 is in the blow molding station 300. As shown in FIG. 18, the two rails 326 are disposed on either side of the carrying path and each are formed with a C-shaped cross-section and have a cam surface 326*a*. These rails 326 have portions which so project that they cover the upper portions of the cam followers 338, and the cam followers 338 cannot leave the rails 326. These rails 326 are disposed in the blow molding section 310.

On the other hand, in all parts of the carrying path outside the blow molding section 310, for example as shown in FIG.

19 showing the heating section 306, the carrier base 324 is provided below the carrying path. Upper surfaces of this carrier base 324 constitute cam surfaces 324a. Portions of the rails 326 disposed in the heating section 306 are so disposed that they cover the upper portions of the cam followers 338 and prevent the cam followers 338 from escaping from their travel paths. Because if the carrier base 324 were provided in the blow molding section 310 it would not be possible for a drawing rod and a blow core mold to be inserted from below into the preform 1, such a construction is not used.

An rotating sprocket 348 is mounted on the cylinder 342 of the carrier member 330. When the preform 1 is in the heating section 306, this rotating sprocket 348 rotates the preform 1 about its vertical axis; this point will be further discussed in the description of the heating section 306.

The driving sprocket 320a repeats an intermittent carrying movement wherein it moves by an amount corresponding to one pitch of the carrier members 330 fixed to the carrier chain 322 at a predetermined pitch and then stops for a predetermined period of time. By the preform 1 being received in an inverted state by the preform receiving section 304 of the blow molding station 300 the preform 1 is placed on the carrying surface 344 of the carrier member 330 and the carrying pin 346 is inserted into the neck portion 2 of the preform 1. When after that the driving sprocket 320a is driven and rotates, the carrier chain 322 meshing with the sprockets 320a to 320d moves and the carrier members 330 are thereby moved by one pitch. By this carrying operation being repeated, the preforms 1 received in the preform receiving section 304 are carried through the heating section 306 and the standby section 308 to the blow molding section 310, and here they are drawn and blow molded into bottles 6. After that the bottles 6 on the carrier members 330 are carried to the bottle ejecting section 312, and here the bottles 6 are ejected to outside the apparatus.

Heating Section 306

Next, the heating section 306 will be described with reference to FIG. 19 and FIG. 20.

The heating section 306 heats the preform 1 by means of radiant heat in a space enclosed by a heating box cover 350. As described above, in the apparatus of this preferred embodiment, the preform 1 can be amply cooled by the injection core mold 50 while it is being carried to the preform ejecting section 16 and in the preform ejecting section 16 until the injection core mold 50 is released from the preform 1. As a result, while the method is still a hot parison method, the preform 1 can be amply cooled and can be cooled to a temperature lower than is suitable for blow molding. For this reason, in the apparatus of this preferred embodiment, the preform 1 is heated in the heating section 306 provided in the blow molding station 300 until it reaches a temperature suitable for blow molding.

Inside the heating box cover 350 of the heating section 306 there are provided first to fourth barlike heaters 352a to 352d constituting a first heater set disposed spaced apart in the axial direction of the preform 1. The barlike heaters 352a to 352d are for example infrared heaters, and extend in the preform 1 carrying direction inside the heating box cover 350. The first and second barlike heaters 352a and 352b are partly surrounded by a focussing reflecting plate 354a, and heat especially the bottom portion 3 of the preform 1 with radiant heat. The third and fourth barlike heaters 352c and 352d are partly surrounded by a focussing reflecting plate 354b and heat especially the vicinity of the trunk portion 4 of the preform 1 with radiant heat. As shown in FIG. 19, a reflecting plate 356 is disposed on the other side of the carrying path facing the barlike heaters 352a to 352d.

Figure 19:
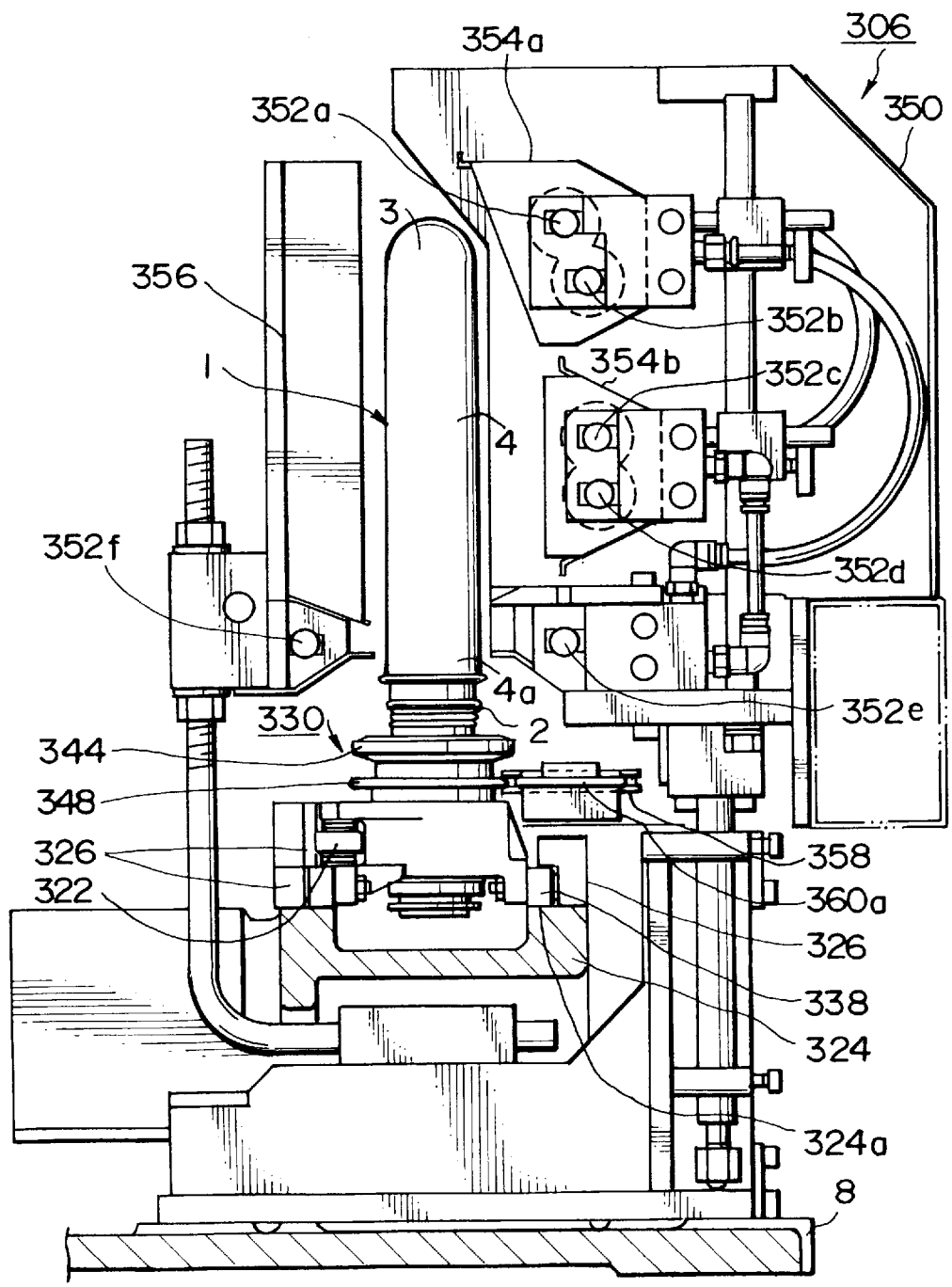
FIG. 19 is a side view in the preform carrying direction of a heating section.

Also, as shown in FIG. 19, fifth and sixth barlike heaters 352e and 352f constituting a second heater set are disposed one on either side of the preform 1 carrying path. These barlike heaters 352e and 352f are positioned at such a vertical height that they face the vicinity of the neck portion 2 of the preform 1 which is draw orientated in the blow molding section 310. The region of the preform 1 heated by these fifth and sixth barlike heaters 352e and 352f is the region which is immediately below the neck portion 2 when the preform 1 is upright, and will hereinafter be called the region below the neck 4a.

This region below the neck 4a is the region corresponding to the shoulder portion of the blow molded bottle 6. Consequently, when the preform 1 is positioned inside the blow mold 378, this region below the neck 4a is in the position closest to the surface of the blow cavity. Because of this, because the transverse axis orientation rate is low, the region below the neck 4a tends to become thick, but by amply heating the region below the neck 4a it is possible for it to be molded to the desired thinness. To this end, in this preferred embodiment, as well as the fifth and sixth barlike heaters 352e and 352f being disposed in positions where they face the region below the neck 4a of the preform 1, the heat-radiating surfaces of these heaters are disposed closer to the region below the neck 4a than the other heaters are to the preform 1.

Figure 20:
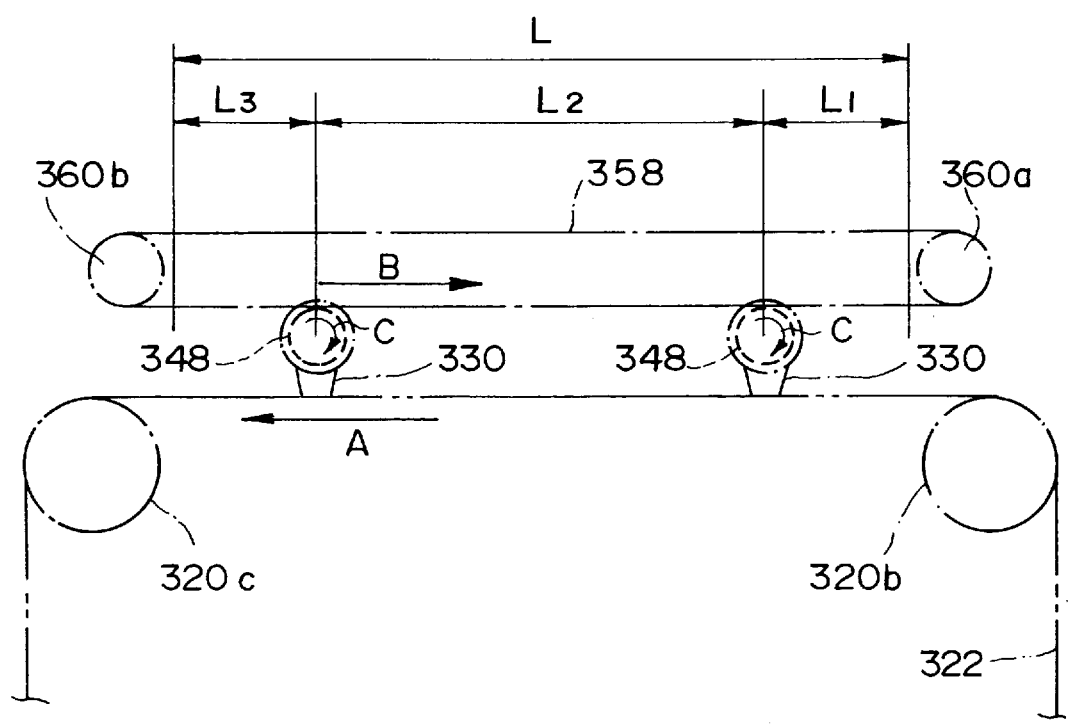
FIG. 20 is a plan view showing in outline a rotating carrier mechanism of the heating section.

As shown in FIG. 20, two sprockets 360a and 360b are disposed inside the heating box cover 350 of this heating section 306, and an rotation drive chain 358 runs around these two sprockets 360a and 360b. This rotation drive chain 358 also meshes with the rotating sprocket 348 on the carrier member 330 that has been carried into the heating section 306. As a result of this arrangement, when the rotation drive chain 358 is driven, the rotating sprocket 348 rotates, this rotation is transmitted by way of the cylinder 342 to the preform 1, and the preform 1 is rotated.

As a result, when the preform 1 is carried into the heating section 306, the bottom portion 3 and the trunk portion 4 of the preform 1 receive radiant heat both from the barlike heaters 352a to 352d disposed on one side of the carrying path and from the reflecting plate 356 disposed on the other side of the carrying path, and because the preform 1 is rotated it receives heat substantially uniformly in the circumferential direction and therefore is heated uniformly in the circumferential direction. Also, the region below the neck 4a of the preform 1 is amply heated by the fifth and sixth barlike heaters 352e and 352f disposed close to the preform 1 on either side of the carrying path, and furthermore the rotation of the preform 1 ensures that this region below the neck 4a also is heated substantially uniformly in the circumferential direction.

Here, as shown in FIG. 20, when the preform 1 carrying direction is direction A, the direction of travel of the rotation drive chain 358 where it meshes with the rotating sprocket 348 of the carrier member 330 is made direction B, the opposite direction to direction A. The reason for this is as follows:

If the carrier chain 322 and the rotation drive chain 358 were both to move at the same speed and in the same direction, direction A, there would be no relative movement between the rotating sprocket 348 on the carrier member 330 side and the rotation drive chain 358, and the preform 1 would not rotate at all. Even if the running speeds of the carrier chain 322 and the rotation drive chain 358 were to be changed, depending on the sizes of the speeds the rotation of the preform 1 would either be extremely slow or would be reverse rotation. These situations will not occur if the rotation drive chain 358 is driven at a higher speed than the carrier chain 322, but normally it is not desirable to rotate it at high speed in this way for reasons relating to moment. When rotated at high speed, if the preform 1 is slightly bent, this bend will be made greater by the strong moment it undergoes and this will cause uneven heating of the preform 1 and adversely affect the thickness distribution of the bottle 6.

Therefore, in the preferred embodiment shown in FIG. 20, by having the carrier chain 322 and the rotation drive chain 358 run in opposite directions, when the preform 1 is carried in direction A the direction of its rotation will always be the arrow C direction, and the problems described above are eliminated. The preform 1 rotates faster while it is being moved than when it is at a preform 1 stopping position.

Also, in this preferred embodiment, the total number of revolutions through which the preform 1 is rotated while it is inside the heating zone inside the heating box cover 350 is made a substantially integral number. In this preferred embodiment, 'while the preform 1 is in the heating zone' refers to the time that the preform 1 spends moving through the distances L1, L2 and L3 (L1+L2+L3=the heating zone length L), as shown in FIG. 20, and the time the preform 1 spends stopped at the two positions shown in FIG. 20. L1 is the distance over which the preform 1 is carried between entering the heating zone and the first stopping position; L2 is the distance between the two stopping positions; and L3 is the distance over which the preform 1 is carried between the second stopping position and leaving the heating zone. In this preferred embodiment, by making the number of turns through which the preform 1 rotates in this carrying time and stopped time a substantially integral number of turns, the radiant heat from both sides of the preform 1 carrying path can be received substantially uniformly in the circumferential direction of the preform 1 and temperature variation in the circumferential direction of the preform 1 can thereby be prevented.

Also, according to this preferred embodiment, the operation of heating the preform 1 in this heating section 306 can be carried out after any temperature difference between the inner wall and the outer wall of the preform 1 has been sufficiently reduced. That is, in this preferred embodiment, the preform 1 is amply cooled from the inner wall side thereof by the injection core mold 50 in the preform molding station 10. As a result, the inner wall temperature of the preform 1 ejected in the preform ejecting section 16 is low, and the outer wall temperature is high. However, this preform 1 does not immediately enter the heating section after a short carrying period as in the case of a so-called hot parison or 1-stage apparatus but rather enters the heating section 306 after being transferred by the transfer station 200 and carried stepwise by the carrier member 330. As a result, after the preform 1 is released from the injection molds, a considerably longer cooling time elapses than in a so-called 1-stage apparatus before the preform 1 enters the heating section 306. Because of this, the difference between the temperatures of the inner and outer walls of the preform 1 can be amply moderated. This lack of temperature difference between the inner and outer walls is the same as in so-called cold parison or 2-stage apparatuses, but because unlike the case in these apparatuses the bottle 6 in this preferred embodiment can be blow molded from a preform 1 still containing heat from when it was injection molded, the preferred embodiment is superior in that less heat energy has to be given to the preforms and therefore energy can be saved.

Furthermore, with this preferred embodiment, by heating control of preforms 1 cooled to a temperature lower than a blow molding temperature (but considerably higher than room temperature), the stability of the preform temperature from molding cycle to molding cycle is improved and it is possible to reduce the variation in temperature occurring when a plurality of simultaneously injection molded preforms 1 are blow molded non-simultaneously. Also, in the apparatus of this preferred embodiment, the carrying pitch at which the preforms 1 are carried by the second circulatory carrier 302 is maintained at a fixed pitch. In contrast to this, in conventional cold parison or 2-stage molding machines, the carrying pitch is made smaller when the preforms are heated in the heating section and the carrying pitch is made larger when they enter the blow molding section. The reason why the carrying pitch is made smaller in the heating section is that because it is necessary to heat the preforms all the way from room temperature to the blow molding temperature the total number of preforms inside the heating section is made as large as possible in order to keep the apparatus as small as possible. The reason why the carrying pitch is made larger in the blow molding section, on the other hand, is that when a plurality of preforms are to be blow molded simultaneously the distance between the preforms has to be made at least greater than the maximum width of the molded product. Also, preforms about to be carried into the blow molding section and preforms having just been carried out of the blow molding section have to standby outside the blow mold clamping apparatus of the blow molding section. Because of this, in conventional 1-stage molding machines the carrying pitch has to be changed midway around the carrying path and the apparatus consequently is complex.

In contrast with this, in this preferred embodiment apparatus, because bottles 6 are blow molded from preforms 1 which still contain heat from when they were injection molded in the injection molding section 14, the amount of heat energy which has to be given to the preforms 1 in the heating section 306 is very small compared to a 2-stage case. As a result, the preforms 1 can be fully reheated to the blow molding temperature without the total number of preforms 1 in the heating section 306 being increased, and it is not necessary for the carrying pitch to be changed midway around the carrying path.

Standby Section 308

As shown in FIG. 1, in the carrying path between the heating section 306 and the blow molding section 310, one stop of the preform 1 performed by the normal carrying sequence carrying out intermittent drive is allocated to the standby section 308. The provision of this standby section 308 makes it possible to moderate the temperature distribution in the preform 1, which, being made of a synthetic resin, has poor thermal conductivity. Like the heating in the heating section 306 in this preferred embodiment apparatus, the heating of the preform 1 is normally carried out from the outside using radiant heat. Because of this, the temperature of the inner wall of the preform 1 becomes lower than the temperature of the outer wall. In the apparatus of this preferred embodiment, after the preform 1 is carried out of the heating section 306, by stopping the preform 1 at least once in the standby section 308 before it is carried into the blow molding section 310 it is possible to reduce this temperature difference between the inner and outer walls and the blow molding characteristics of the bottle 6 can thereby be stabilized.

During this temperature distribution moderation in the standby section 308 it is also possible to perform temperature conditioning of the preform 1 actively. By actively performing temperature conditioning of the preform 1 in the standby section 308 it is possible to obtain a temperature distribution which cannot be obtained just by heating the preform 1 while rotating it in the heating section 306.

Figure 23:
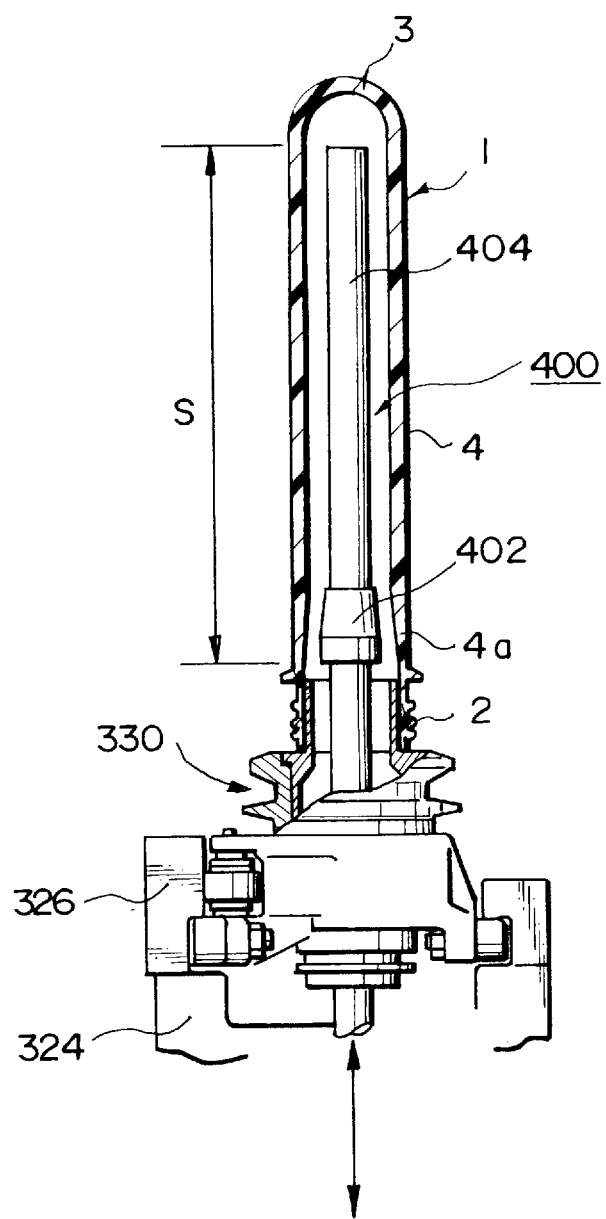
FIG. 23 is a sectional view of a temperature conditioning core disposed in a standby section.

As a temperature conditioning member disposed in the standby section 308, for example a temperature conditioning core 400 which is inserted from below the preform 1 into the preform 1 and performs temperature conditioning from the inner wall side over a temperature conditioning region S can be used, as shown in FIG. 23. This temperature conditioning core 400 has a first temperature conditioning core 402 which performs temperature conditioning of the region below the neck 4*a* of the preform 1 from the inner wall side thereof. This temperature conditioning core 400 also has a second temperature conditioning core 404 which performs temperature conditioning on the trunk portion excluding the region below the neck 4*a*. As described above, because it is necessary to condition the temperature of the region below the neck 4*a* to a higher temperature than other regions, in FIG. 23 the first temperature conditioning core 402 has a larger diameter than the second temperature conditioning core 404. Alternatively, a layer consisting of a material which radiates heat of such a wavelength that it is easily absorbed by the resin material from which the preforms 1 are molded (for example PET) may be coated onto the first temperature conditioning core 402.

Figure 24:
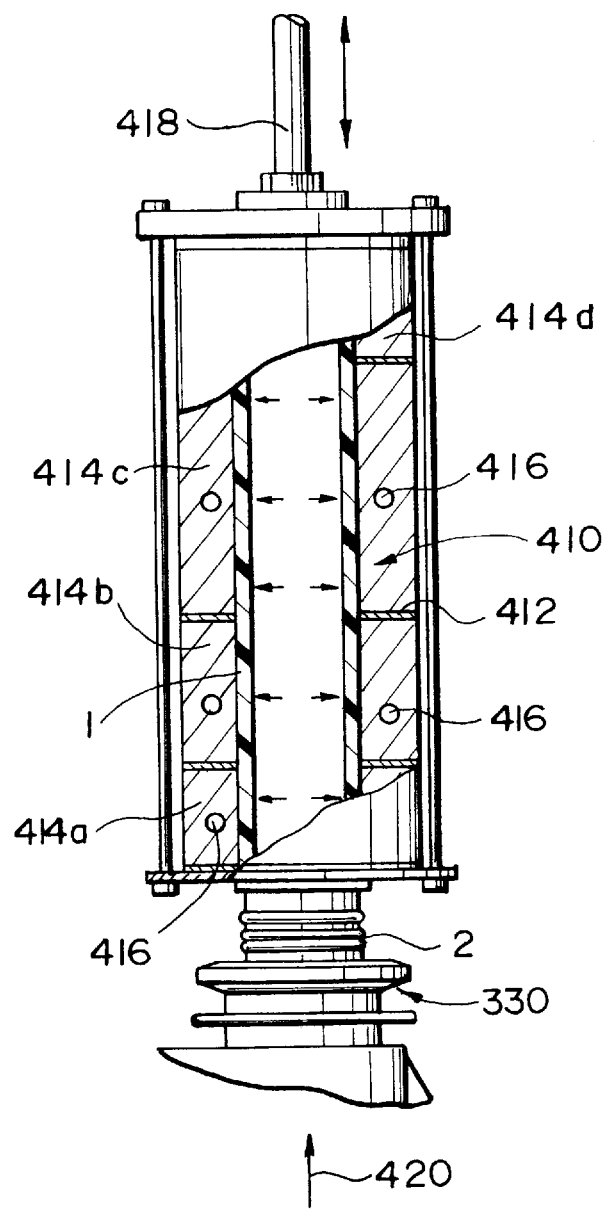
FIG. 24 is a sectional view of a temperature conditioning pot disposed in the standby section.

As shown in FIG. 24, the temperature conditioning member can also be made a temperature conditioning pot 410 having a cylindrical portion which can be positioned around the preform 1. In this case, the temperature conditioning pot 410 has blocks 414*a* to 414*d* divided into zones in the axial direction of the preform 1 by thermal insulation 412, and each of the blocks 414*a* to 414*d* has an independent temperature conditioning fluid passage 416 whereby independent temperature control of each zone is carried out. Because the temperature conditioning pot 410 can be so positioned that is covers the preform 1, a temperature distribution stepped in the axial direction of the preform 1 can be certainly obtained. By this means, it is possible to for example condition the region below the neck 4*a* to a high temperature and condition the bottom portion 3 to a low temperature. As shown in FIG. 14, it is also possible to apply an internal pressure to the preform 1 by introducing air into the preform 1 in the direction of the arrow 420 and thereby bring the outer wall of the preform 1 and the blocks 414*a* to 414*d* into contact and facilitate the temperature conditioning.

Figure 25:
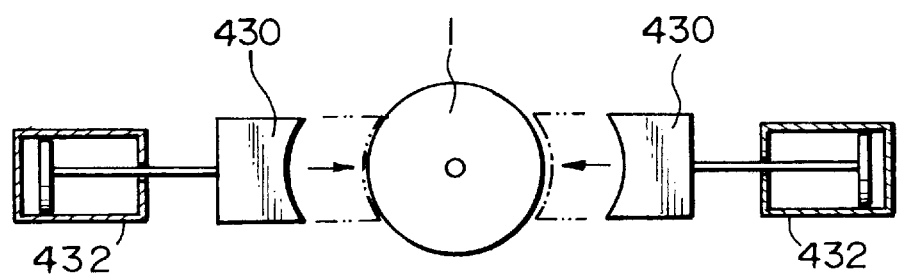
FIG. 25 is a sectional view of local temperature conditioning members disposed in the standby section.
Figure 26:
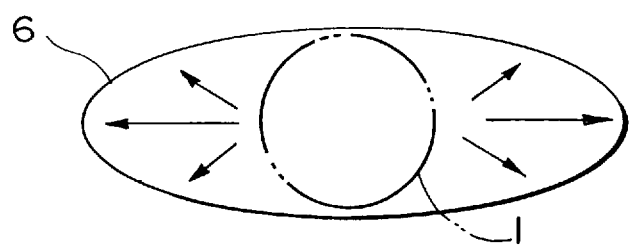
FIG. 26 is a view of a flat container blow molded after the temperature conditioning shown in FIG. 25.

Also, as this kind of temperature conditioning member, it is possible to use a member which in one or a plurality of locations in the circumferential direction of the preform 1 extend in the axial direction of the preform 1 and impart the preform 1 with a temperature distribution in the circumferential direction thereof. For example, as shown in FIG. 25, it is possible for example at both sides of the preform 1 to dispose a pair of cooling members 430 along the axial direction of the preform 1 and bring them into contact with the side wall of the trunk portion of the preform 1 using air cylinders 432 or the like. When this is done, the preform 1 is given a temperature distribution in the circumferential direction, and for example as shown in FIG. 26 it is possible to fully secure the wall thickness required of the high transverse axis drawing rate region of a flat bottle 6. This kind of measure can be applied not only to flat containers but also to for example square containers. When a temperature distribution in the circumferential direction of the preform 1 is to be imparted, besides bringing a cooling member into contact with the preform 1 it is also possible to position a heating member in the vicinity of the preform 1.

Blow Molding Section 310

The blow molding section 310 has two blow mounting plates 370 mounted on the machine bed 8, one on either side of the preform 1 carrying path. As shown in FIG. 4, for example four tie bars 372 are mounted crossing between these two blow mounting plates 370. Two blow mold clamping plates 374 which move horizontally along the four tie bars 372 are mounted between the blow mounting plates 370. These two blow mold clamping plates 374 are opened and closed symmetrically about a vertical line by a blow mold clamping mechanism 376, comprising for example hydraulic pistons, mounted on the blow mounting plates 370.

A pair of split molds 378*a* and 378*b* constituting the blow mold 378 are mounted on these two blow mold clamping plates 374. In the case of the preferred embodiment apparatus shown in FIG. 1, because the number n of bottles simultaneously blow molded is n=1, a cavity for one bottle is formed in the pair of split molds 378*a* and 378*b*. In the case of the preferred embodiment apparatus shown in FIG. 21, because the number n of bottles simultaneously blow molded is n=2, cavities for two bottles are formed in the pair of split molds 378*a* and 378*b*.

A cylinder mounting plate 380 is mounted at a position midway along the upper two tie bars 372, and a bottom mold driving cylinder 382 is mounted on this cylinder mounting plate 380. This bottom mold driving cylinder 382 raises and lowers a bottom mold 384. In this preferred embodiment, because the bottle 6 is blow molded from a preform 1 which is inverted, the bottom mold 384 is made movable up and down above the preform 1.

Thus in this preferred embodiment, while raising productivity by injection molding N=4 preforms 1 simultaneously in the injection molding section 14 of the preform molding station 10, by only molding n=1 bottle 6 at a time in the blow molding section 310 it is possible to raise the operation rate of the blow cavity mold 378. Also, by reducing the number of cavities in the blow cavity mold 378, which is a relatively expensive type of mold, mold costs, molds being consumable items, can be reduced. Furthermore, in this preferred embodiment apparatus, because in the preform molding station 10 the preforms 1 are amply cooled before they are released from the injection molds, and because enough cooling time is provided thereafter for the temperature difference between the inner and outer walls of the preforms 1 to be moderated before the preforms 1 are heated to the blowing temperature, the uniformity of the temperature distribution of the retained heat in the preforms 1 can be increased and the stability of the blow molding can be greatly improved.

Bottle Ejecting Section 312

As shown in FIG. 1 and FIG. 4, the bottle ejecting section 312 is disposed in the carrying path of the carrier members 330 carried by the second circulatory carrier 302 between the blow molding section 310 and the preform receiving section 304. This bottle ejecting section 312 has a neck holding mechanism 390 having for example a similar construction to that of the neck holding mechanisms 232 employed in the inverting and handing over mechanism 230. This neck holding mechanism 390 holds the neck portion of the inverted bottle 6 by means of a pair of holding members. As shown in FIG. 3 and FIG. 4, there are also provided a raising and lowering drive device 392 which raises and lowers this neck holding mechanism 390 and an inverting drive device 394 which inverts the neck holding mechanism through an angle of 180. By the neck holding mechanism 390 being raised by the raising and lowering drive device 392, the neck portion of the bottle 6 is pulled upward off the carrying pin 346 of the carrier member 330. After that, by this holding mechanism 390 being rotated through 180° by the inverting device 394, the bottle 6 is brought into an upright state to one side of the machine bed 8, and by the pair of holding members of the neck holding mechanism then being opened, the bottle 6 is discharged to outside the apparatus.

When Simultaneous Molding Numbers Are N=6, n=2

FIG. 21 is a plan view of a preferred embodiment apparatus wherein the simultaneous molding numbers are N=6, n=2. The preferred embodiment shown in FIG. 21 differs from the preferred embodiment apparatus shown in FIG. 1 in the following points:

First, because the blow molding section 310 is to simultaneously blow mold two bottles 6 at a time from among the N=2 simultaneously injection molded preforms, the blow cavity mold 378 has two blow cavities spaced an array pitch P3 apart. The array pitch at which the carrier members 330 carried by the second circulatory carrier 302 are spaced apart is the same pitch as the array pitch P3 of the blow cavities in the blow molding section 310. Also, the total number of carrier members fitted to the carrier chain 322 constituting the second circulatory carrier 302 is twenty, twice as many as in the case of the preferred embodiment shown in FIG. 1. Enough preforms 1 for two blow molding cycles, 2×n=4 preforms 1, are stopped inside the heating section 306. In the standby section 308, enough preforms 1 for one blow molding cycle, n=2 preforms 1, are made to standby. The carrier chain 322 and the carrier members 330 used in the preferred embodiment apparatus of FIG. 21 are the same as those used in the preferred embodiment apparatus shown in FIG. 1, and it is only the positions and pitch at which the carrier members 330 are fitted to the carrier chain 322 that are different.

Figure 22:
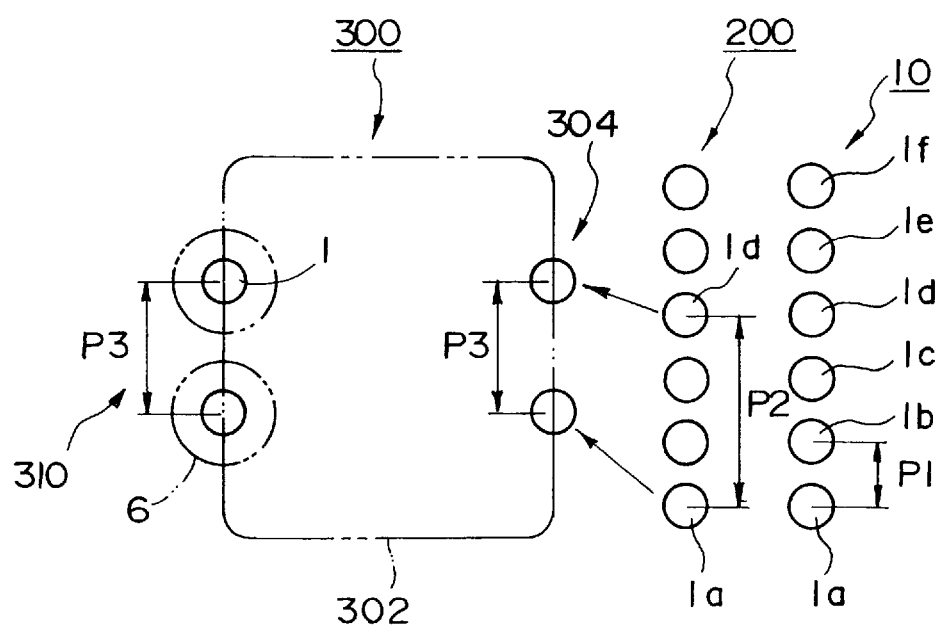
FIG. 22 is a view illustrating the operation of a transfer station transferring preforms while converting their pitch.

In the preferred embodiment apparatus shown in FIG. 21, in the transfer station 200, the number n=2 of preforms 1 simultaneously blow molded in the blow molding section 310 are simultaneously transferred. For this, a transfer pitch converting operation, which will now be explained with reference to FIG. 22, is necessary. In FIG. 22, six preforms 1 simultaneously injection molded in the injection molding section 14 of the preform molding station 10 are shown as preform 1a to preform 1f. In FIG. 22, the first row on the right shows the array pitch of the preforms 1 injection molded in the preform molding station 10. The array pitch of the preforms 1 at this time is the same as the array pitch P1 of the core pins 52 of the injection molding section 14. The second row from the right in FIG. 22 shows the state of the preforms 1 before they are received by the inverting and handing over mechanism 230 of the transfer station 200. The array pitch of the preforms 1 here is also the pitch P1. The third row from the right in FIG. 22 shows the state of two preforms 1 received by the preform receiving section 304 of the blow molding station 300. The transfer of these two preforms 1 is carried out using the two pairs of neck holding members 234 shown in FIG. 4. The array pitch of the preforms 1 received by the preform receiving section 304 is the same as their array pitch P3 in the blow molding section 310.

Here, in the transfer station 200, when the two preforms 1 are transferred by the two pairs of neck holding members 234, first, for example the first and fourth preforms 1a and 1d are held. That is, the two preforms 1a and 1d are held and the two preforms 1b and 1c are ignored this time. As a result, the array pitch P2 of the neck holding members 234 at this time is P2=3×P1. This pitch conversion from the pitch P2 to the pitch P3 is carried out by the array pitch of the two neck holding mechanisms 232 being converted by the pitch change drive device 254 shown in FIG. 14. Similarly thereafter, by the second and fifth preforms 1b and 1e being transferred and then the third and sixth preforms 1c and 1f being simultaneously transferred after that, the operation of transferring of the six simultaneously molded preforms 1 is completed.

When the simultaneous molding numbers N, n are made N=4, n=2, the transfer operation in the transfer station 200 is carried out with pitch conversion from the pitch P2=2×P1 to the pitch P3 being performed and two preforms being held while the one preform between them is ignored until the next time.

In the case of the preferred embodiment apparatus shown in FIG. 21, the ratio (N/n) of the simultaneous molding numbers N and n is 3. According to studies carried out by the present inventors, in the case of general-purpose medium-sized containers of capacity about 1 to 3 liters having relatively small mouths (the diameter of the opening of the neck portion 2 being about 28 to 38 mm), the ratio of the simultaneous molding numbers N, n should ideally be set to N:n=3:1. The reason for this is as follows: The size of a preform for molding a general-purpose medium-sized container, although some elements do vary according to the application, is within a substantially fixed range. This is because the preform size is determined by the drawing factor necessary to obtain the drawing characteristics of polyethylene terephthalate (PET) resin and the drawing factor necessary for molding stability. Although there is some variation depending on the use for which the container is intended, research carried out by the present inventors has shown that the maximum thickness of the trunk portion 4 of a preform 1 used for a general-purpose medium-sized container lies within the range 3.0 to 4.0 mm.

Generally, the blow molding cycle time (the time required between when a preform 1 is carried into the blow molding section 310 and when the next preform 1 is carried in) required for blow molding by a blow molding machine is approximately 3.6 to 4.0 seconds.

In the case of this preferred embodiment, wherein the preforms 1 are cooled by the injection core mold 50 even after being released from the injection cavity mold 42 and then blow molded thereafter, the time required for molding a preform for this kind of general-purpose medium-sized container is shortened to about ¾ of that of a conventional injecting stretch blow molding machine, and an injection molding cycle time of approximately 10 to 15 seconds is sufficient.

Therefore, if this injection molding cycle time (approx. 10 to 15 seconds) is T1 and the blow molding cycle time (3.6 to 4.0 seconds) is T2, the ratio T1:T2 is about 3:1, and it is established that in order to efficiently mold general-purpose medium-sized containers the simultaneous molding numbers N and n should ideally be set in accordance with this ratio. When a large container is to be molded from a thicker preform an injection molding cycle time of 16 seconds or more is suitable and the ratio N:n can be set to around 4:1. When a small container is to be molded from a thin preform the injection molding cycle time is shortened and consequently the ratio N:n can be set to for example 4:2.

Thus, if N/n is set to 3, the injection molding cycle and the blow molding cycle will be suitable for molding medium-sized containers, for which the market demand is the greatest, and a blow molding machine with little waste in the molding cycles can be realized.

Intermediate Preform Discharge Mechanism

In this preferred embodiment, as shown in FIG. 2 and FIG. 3, a preform dropout opening is provided in the part of the machine bed 8 where the transfer station 200 is disposed. This preform dropout opening 8a is continuous with a chute 8b formed inside the machine bed 8, and this chute 8b leads to a preform discharge opening 8c formed in the side of the machine bed 8.

With this type of hot parison blow molding machine there are various situations wherein it is desirable that the transfer to the blow molding station 300 of the preforms 1 being molded in the preform molding station 10 be stopped. For example, when the whole blow molding machine is started up, until the preform 1 injection molding characteristics stabilize it is preferable that the imperfect preforms 1 being produced at this stage not be supplied to the blow molding station 300. Also, when for some reason trouble has arisen in the blow molding station 300 it is preferable that only the operation of the blow molding station 300 be stopped and that the operation of the preform molding station 10 not be stopped so that preforms 1 continue to be molded. This is because there are various heating parts in the preform molding station 10 and consequently once the preform molding station 10 is shut down a considerable amount of time is required to start it up again.

In this preferred embodiment, when such a situation arises, the preforms 1 continuing to be injection molded in the preform molding station 10 are discharged to the side of the machine bed 8 through the above-mentioned preform dropout opening 8a, the chute 8b and the discharge opening 8c instead of being transferred to the blow molding station 300 by the transfer station 200. This preform 1 discharging operation can for example be carried out by the pair of neck holding members 234 of the inverting and handing over mechanism 230 taking hold of the preforms 1 as usual but then, without inverting them through 180°, moving the preforms 1 for example horizontally to a predetermined position above the preform dropout opening 8a in the machine bed 8 and then simply releasing the preforms 1.

This preferred embodiment, as sequence control modes, has a bottle molding operating mode wherein the preforms 1 are transferred to the blow molding station 300 and blow molding of the bottles 6 is performed, and a preform molding operating mode wherein the preforms 1 are not transferred to the blow molding station 300. It is possible to change over from the normal bottle molding operating mold for example automatically when an abnormality is detected by a sensor or the like or by an operator flicking a manual switch. When the apparatus is switched over to the preform molding operating mode the operation of the transfer station 200 changes over to the operation of carrying the preforms 1 to the preform dropout opening 8a as described above, and no further preforms 1 are transferred to the blow molding station 300.

Modified embodiment of the standby section 308

Figure 27:
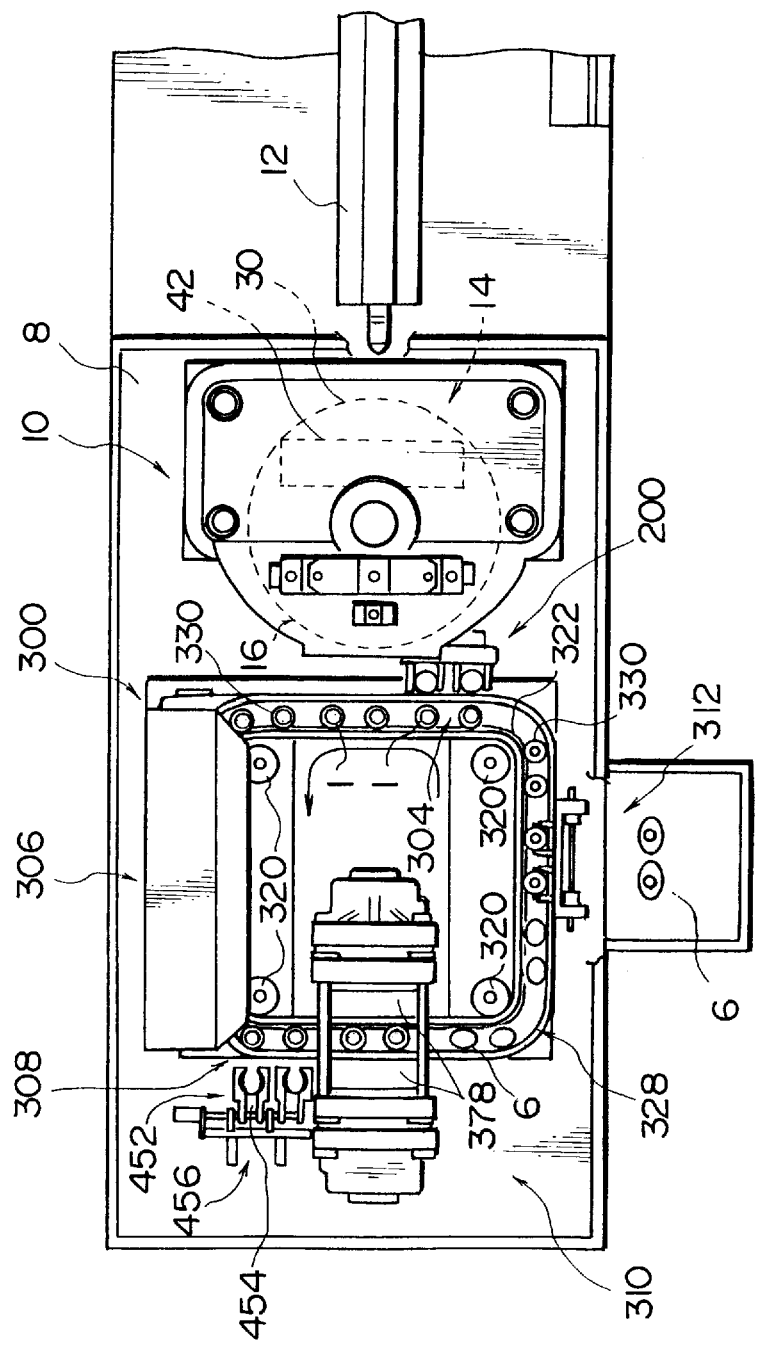
FIG. 27 is a plan view showing a container molding apparatus which is another embodiment of the invention.

FIG. 27 is a plan view showing a modification of the molding apparatus, in which the construction of the standby section 308 of the apparatus shown in FIG. 21 is modified.

In this embodiment, as in the apparatus shown in FIG. 21, two preforms 1 are stopped at the standby section 308 of the blow molding station 300.

In the standby section 308, two preforms 1 which have passed through the heating section 306 and been heated, are put on standby, whereby the temperature difference between the inner and outer surfaces of the two preforms 1 is moderated.

Further, in the standby section 308 are provided a cooling means 452 functioning as a temperature conditioning means which conditions the temperature of preforms 1 carried from the heating section 306, a positioning plate 454 positioning the carrier members 330, and an advancing and withdrawing drive means 456 for advancing and withdrawing the cooling means 452 and the positioning plate 454 with respect to the carrier members 330.

It should be noted that in this embodiment, the first advancing and withdrawing drive means which advances and withdraws the cooling means 452 and the second advancing and withdrawing drive means which advances and withdraws the positioning plate 454 are constituted by the single advancing and withdrawing drive means 456. In place of this, two separate advancing and withdrawing drive means may equally be provided.

The cooling means 452, positioning plate 454, and advancing and withdrawing drive means 456 are disposed outside the circulatory carrying path of the carrier members 330, and effectively utilize the space outside the circulatory carrying path where there are few components.

Figure 28:
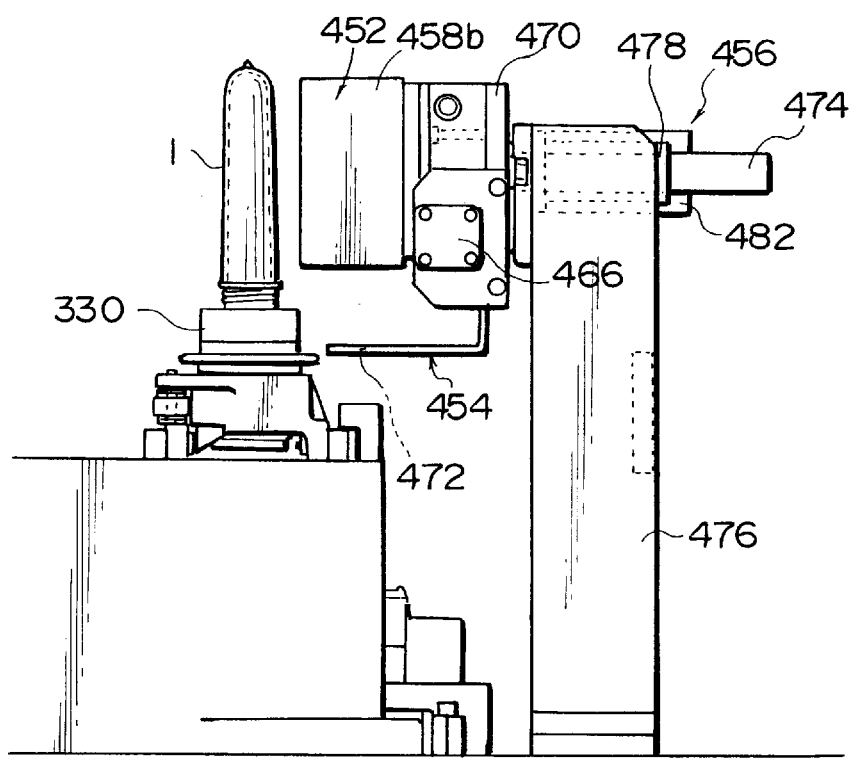
FIG. 28 is a side view of the standby section shown in FIG. 27.
Figure 29:
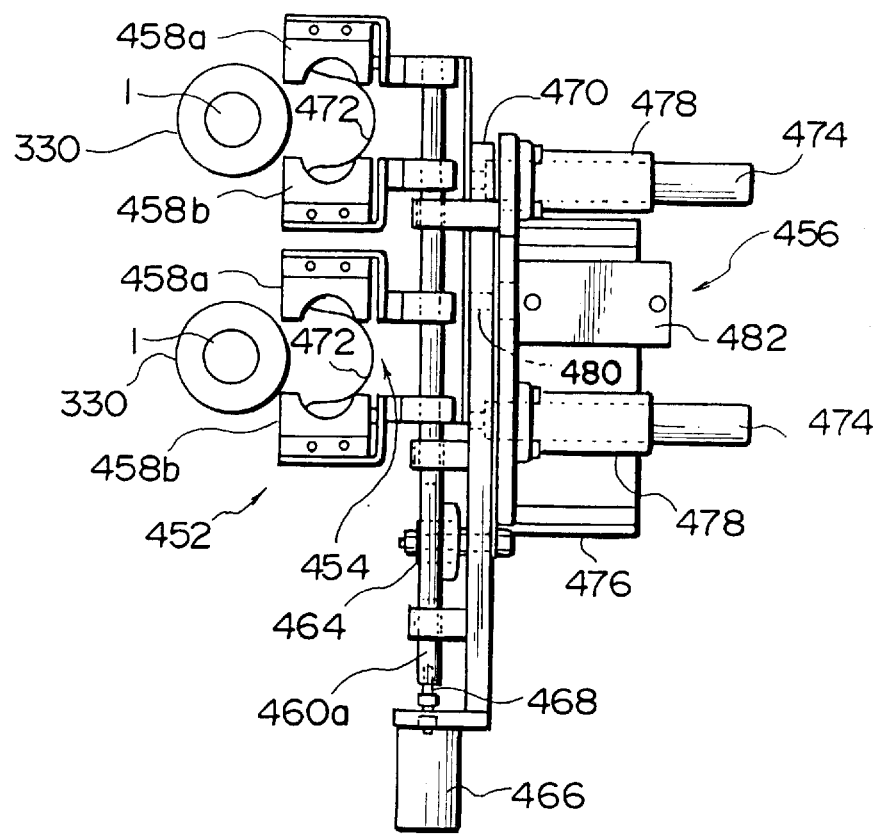
FIG. 29 is a plan view with part of the standby section shown in FIG. 28 omitted.
Figure 30:
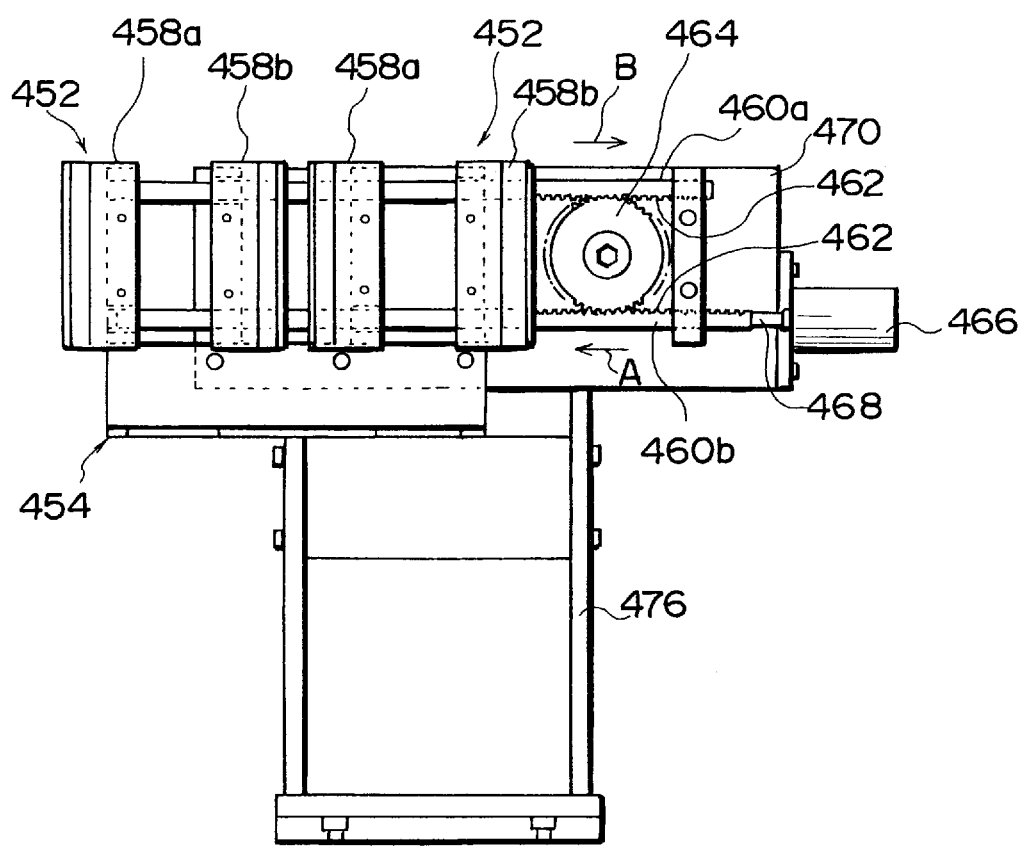
FIG. 30 is a front view of the standby section shown in FIG. 28.

FIGS. 28 to 30 show the temperature conditioning means of the standby section.

The cooling means 452 has two pairs of cooling blocks 458a and 458b which can be opened and closed, and each pair of cooling blocks 458a and 458b is supported by a pair of opening and closing rods 460a and 460b arranged parallel to each other at top and bottom (in FIG. 29 only the upper rod 460a is shown).

One cooling block 458a of each pair has the upper opening and closing rod 460a fixed thereto, and the lower opening and closing rod 460b passing through. The other cooling block 458b of each pair has the lower opening and closing rod 460b fixed thereto, and the upper opening and closing rod 460a passing through.

Furthermore, the pair of opening and closing rods 460a and 460b are each disposed so as to be slidable along their axes, and as shown in FIG. 30, opposing surfaces of the pair of opening and closing rods 460a and 460b have racks 462 formed thereon. Between the racks 462 of the pair of opening and closing rods 460a and 460b is provided a pinion 464 which engages with the racks 462. One end of the lower opening and closing rod 460b is connected to the drive rod 468 of an opening and closing cylinder 466.

As a result, when the drive rod 468 of an opening and closing cylinder 466 is driven in the direction of arrow A in FIG. 30, the lower opening and closing rod 460b slides in the direction of the arrow A, and moves the two cooling blocks 458b in the direction of the arrow A. At the same time, through the two racks 462 and the pinion 464, the upper opening and closing rod 460a slides in the direction of the arrow B in FIG. 30, and moves the two cooling blocks 458a in the direction of the arrow B. In this way each pair of cooling blocks 458a and 458b is closed, and in this state between each pair of cooling blocks 458a and 458b a preform 1 is clamped.

Each of the two pairs of cooling blocks 458a and 458b contacts the preform 1 only by both sides of the trunk portion thereof, so that both sides of the trunk portion are cooled.

The height of the two pairs of cooling blocks 458a and 458b is made to be substantially the same as the length of the trunk portion of the preform 1, but the shape of the contact surface with the preform 1 is such as to correspond with the portion of both side surfaces of the preform 1 being the partial surfaces subject to temperature conditioning.

Furthermore, the partial surfaces of the preform 1 subject to temperature conditioning (subject to cooling) are supposed to be the leading and trailing portion of the preform surfaces in the carrying direction of the preform 1. In this embodiment, by cooling both sides of the preform 1, a flat container 6 of substantially uniform wall thickness can be molded in the subsequent blow molding process.

This flat container 6 has a horizontal section which has a long axis and a short axis. The flat container 6 has positioned at both ends of the long axis regions of high extension where both side surfaces are maximally extended, and has positioned at both ends of the short axis regions of low extension where both side surfaces are minimally extended. In this embodiment, the regions of both side surfaces of the preform 1 corresponding to the high-extension regions of the container 6 are the surfaces to be cooled. This means that since even when the surfaces to be cooled are extended they do not stretch easily, after the container 6 has been formed excessively thin walls are prevented.

The two split molds 378 which form the blow cavity mold shown in FIG. 1 have a cavity such that their parting surface is parallel to the long axis of the flat container 6. The purpose of this is to improve the removal of air from the two split molds 378 during the blow molding process, and to ensure that the container 6 is blow-molded within the two split molds 378 in its designed shape. Again, between the two separated split molds 378 the preform is carried to and disposed in a direction parallel to the parting surface of the split molds 378. As a result, in order to position the two surfaces to be cooled of the preform 1 to be the leading and trailing part of the preform surfaces in the carrying direction thereof, it is necessary for the preform 1 to be inserted between the two split molds 378.

The positioning plate 454, as shown in FIG. 28, is attached integrally to the bottom of a fixing plate 470 to which the cooling means 452 is attached. The positioning plate 454 is bent into an L-shape, and at the free end thereof are formed two engaging concavities 472 which engage with two carrier members 330.

The advancing and withdrawing drive means 456, as shown in FIGS. 28 and 29, comprises a pair of parallel guide rods 474 provided so as to project horizontally from the rear surface of the fixing plate 470, a pair of guide bearing members 478 above a support frame 476 which slidably accept the pair of guide rods 474, and an advancing and withdrawing cylinder 482 disposed between the pair of guide bearing members 478 of the support frame 476 and a drive rod 480 of which is coupled to the fixing plate 470. The advancing and withdrawing cylinder 482 advances and withdraws the fixing plate 470 through the drive rod 480. In this way, the cooling blocks 458a and 458b and the positioning plate 454 fixed to the fixing plate 470 can be advanced and withdrawn together with respect to the preforms 1 and the carrier members 330.

To cool two preforms 1 in the standby section 308, first with the two pairs of cooling blocks 458a and 458b opened by the opening and closing cylinder 466, by means of the advancing and withdrawing cylinder 482 the cooling blocks 458a and 458b and positioning plate 454 are withdrawn and put on standby. At this time, two carrier members 330 carrying two preforms 1 are carried from the heating section 306, and are stopped in the standby section 308. Thereafter, by means of the advancing and withdrawing cylinder 482, the cooling blocks 458a and 458b and positioning plate 454 are advanced by way of the fixing plate 470. In this way the two engaging concavities 472 of the positioning plate 454 engage with the side surfaces of the two carrier members 330, and position the carrier members 330. Simultaneously, the two pairs of cooling blocks 458a and 458b are advanced to positions opposing the leading and trailing portion in the transport direction of the preforms 1.

In this state, the two pairs of cooling blocks 458a and 458b are closed by the opening and closing cylinder 466. This causes the two pairs of cooling blocks 458a and 458b to contact the two preforms for a specific time interval, and the two preforms 1 are simultaneously cooled.

The temperature of the two pairs of cooling blocks 458a and 458b and the contact time can be set and conditioned according to the thickness of the preform 1, or the specification required for the container.

After cooling for the specific time interval, the two pairs of cooling blocks 458a and 458b are opened by the opening and closing cylinder 466, and the two pairs of cooling blocks 458a and 458b and the positioning plate 454 are withdrawn by the advancing and withdrawing cylinder 482. By this means, the two carrier members 330 and the two preforms 1 become free to be carried.

In the blow molding section 310, two preforms 1 are blow molded using compressed air to form simultaneously two flat containers 6 of substantially uniform thickness.

It should be noted that naturally the shape of the container is not restricted to being flat, but application is possible to containers such as polygonal containers in which in horizontal section the distance from the preform side wall to the container side wall varies.

Further modification of the standby section 308

FIGS. 31 to 35 show another embodiment for the purposes of forming a thick wall at a desired portion of the side wall of a container, or of maintaining a thick wall state.

In this embodiment, in the same way as in the apparatus of FIG. 1, in a standby section 308 of the blow molding station 300 one preform 1 is stopped. Again, in this embodiment, in the standby section 308 a handle 486 of the preform 1 is inserted.

In this embodiment also, when the handle 486 is inserted, the carrier member 330 is positioned by a positioning means 494. Additionally, after the handle 486 has been inserted into the preform 1, a region of the trunk portion of the preform 1 corresponding to the position of the trunk portion of the container 6 with which an engaging portion 488 of the handle 486 engages is cooled by a cooling means 496. Furthermore, after this, the preform 1 is rotated by a rotating means 498, and the orientation of the preform 1 with the handle 486 inserted is changed.

Figure 31:
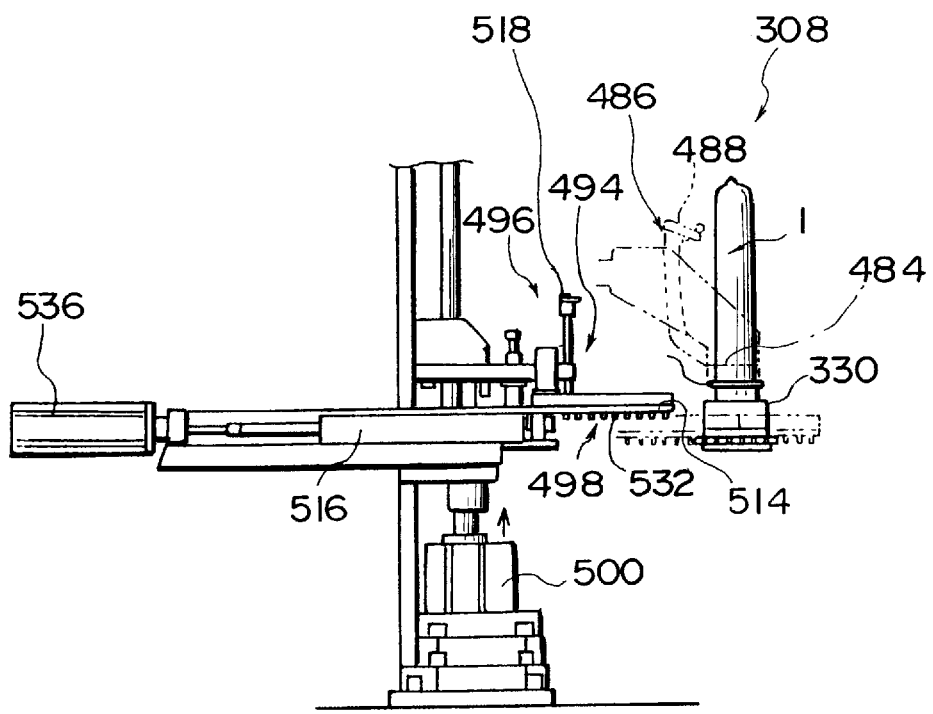
FIG. 31 is a side view of a standby section showing a further embodiment of the invention.

The positioning means 494, as shown in FIG. 31, has a positioning plate 514 provided in an opposing position and engaging with a carrier member 330. The cooling means 496 has an air nozzle 518. Additionally, the rotating means 498 has a rack 532 which is able to engage with the teeth of a rotating sprocket 348 provided on the carrier member 330.

Figure 32:
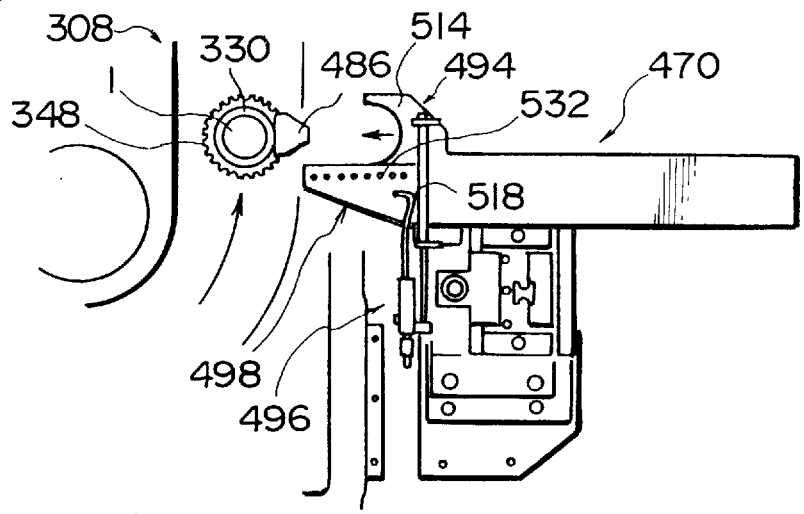
FIG. 32 is a plan view of the standby section shown in FIG. 31.
Figure 33:
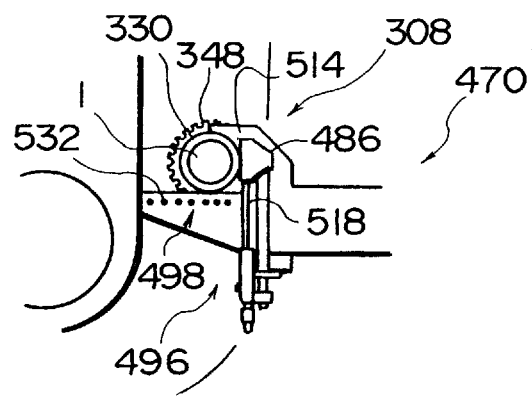
FIG. 33 is a plan view showing a carrier member positioned, and a preform being cooled.
Figure 34:
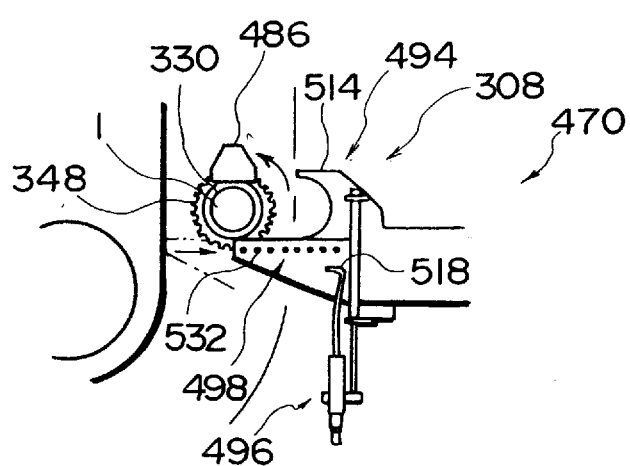
FIG. 34 is a plan view showing the preform rotated from its orientation in FIG. 33.

A first cylinder 516 is provided, which advances and withdraws the positioning plate 514, air nozzle 518, and rack 532 between the position shown in FIG. 32 and the position shown in FIG. 34. Furthermore, a second cylinder 536 is provided, which advances and withdraws the positioning plate 514, air nozzle 518, and rack 532 between the position shown in FIG. 33 and the position shown in FIG. 34.

The air nozzle 518 is disposed in a position opposing a region of the trunk portion of the preform 1 corresponding to the position of the trunk portion of the container 6 with which an engaging portion 488 of the handle 486 during blow molding. Additionally, the air nozzle 518 is movable in a direction intersecting the advance and withdraw direction of the positioning plate 514, in order not to interfere with the handle 486 inserted in the preform 1 when the positioning plate 514 is advanced and withdrawn.

Figure 35:
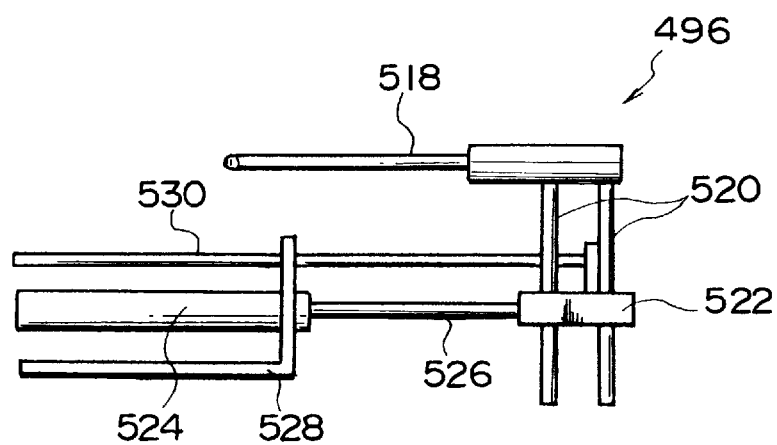
FIG. 35 is a front view showing the cooling means shown in FIG. 31.

For this purpose, as shown in FIG. 35, a drive rod 526 of a drive cylinder 524 is coupled to an attachment member 522 of a support rod 520 supporting the air nozzle 518 at a certain height. Again, a guide rod 530 is fixed to the attachment member 522, and this guide rod 530 is movably guided an attachment bracket 528 of the drive cylinder 524. For this reason, when the drive rod 526 is driven by the drive cylinder 524, the air nozzle 518 is moved between a withdrawn position removed from between the handle 486 and the preform 1 and an air cooling position between the handle 486 and the preform 1.

The rotating sprocket 348 which engages with the rack 532 of the rotating means 498 is, as described above, for the purpose of rotating the preform 1 during heating in the heating section 306, and in this embodiment the rotating sprocket 348 used during heating also serves to change the orientation of the preform 1 in the standby section 308.

Again, the positioning means 494 and the rotating means 498 can be raised and lowered by a raising and lowering cylinder 500.

The operation of the standby section 308 is now described. Firstly, a preform 1 supported in the inverted state by a carrier member 330 is carried to and stopped in the standby section 308. After this, the positioning plate 514, air nozzle 518, and rack 532 are advanced by the first and second cylinders 516 and 536 from the position in FIG. 32 to the position in FIG. 33. As a result, the positioning plate 514 engages with the carrier member 330, and the carrier member 330 is positioned.

In this state, the handle 486 is lowered by an inserted (not shown in the drawings), and a ring portion 484 of the handle 486 is inserted into the trunk portion of the preform Next, when the rack 532 is lowered by the raising and lowering cylinder 500 it engages with the rotating sprocket 348 attached to the carrier member .330, and through this sprocket 348 renders the carrier member 330 rotatable.

In this state, the air nozzle 518 is moved by the drive cylinder 524, and the nozzle tip thereof is positioned between the preform 1 and the handle 486, to cool the region of the trunk portion of the preform 1 corresponding to the position of the trunk portion of the container with which the engaging portion 488 of the handle 486 engages during blow molding (see FIG. 33). After this, the air nozzle 518 is moved by the drive cylinder 524, and the air nozzle 518 is removed from between the preform 1 and the handle 486.

Next, the positioning plate 514, air nozzle 518, and rack 532 are withdrawn by the second cylinder 536 from the position in FIG. 33 to the position in FIG. 34. At this time, by the engagement of the rack 532 and the rotating sprocket 348, the carrier member 330 can be rotated through 90 degrees. By means of this, the preform 1 and handle 486 are rotated together through 90 degrees. As a result, the orientation of the handle 486 can be caused to coincide with the carrying direction of the preform 1 (see FIG. 34).

Therefore, when the preform 1 is inserted between the two split molds 378 constituting the blow cavity mold of the blow molding section 310 the position of the handle 486 can be aligned with handle-receiving concavities formed therein.

In this embodiment, the withdrawing movement of the positioning plate 514 and air nozzle 518 and the linear movement of the rack 532 for rotating the preform 1 are carried out simultaneously by the second cylinder 536. However, in this embodiment, in the state shown in FIG. 34, it is not possible to withdraw the positioning plate 514, air nozzle 518, and rack 532 completely from the transport path of the preforms 1.

The rack 532 is raised by the raising and lowering cylinder 500, and the positioning plate 514, air nozzle 518, and rack 532 are withdrawn by the first cylinder 516 from the position in FIG. 34 to the position in FIG. 32. By this means the carrier member 330 supporting the preform 1 with handle 486 attached is made able to move.

It should be noted that in this embodiment, the withdrawing movement of the positioning plate 514, air nozzle 518, and rack 532 is carried out in two stages, but it may be implemented in a single stage. Again, the means for rotating the preform 1 is not restricted to using a rack. For example, a drive sprocket may be provided which is engageable with the rotating sprocket 348 attached to the carrier member 330, and this drive sprocket may for example by rotated by a servo motor.

The present invention is not limited to the above described embodiments, but a number of variant embodiments are possible within the scope of the present invention.

For example, although in the embodiments described above a one-stage molding apparatus is described, the present invention is not limited to this, and may be applied to a two-stage molding apparatus.

Furthermore, in the embodiments above, the case is described in which the temperature conditioning means disposed at the standby section 308 is a cooling means, but the invention is not restricted to this, and it is also possible to use a heating means.

As the cooling means, a plurality of air nozzles may be provided, or a porous member such as a filter may be disposed between the air nozzle and the outer surface of the preform, in order to carry out the cooling with air passing uniformly over a greater area.

What is claimed is:

1. An apparatus for molding a container comprising:
    a heating section for heating a preform made of synthetic resin to at least a blow molding temperature;
    a blow molding section for blow molding said preform which is heated at said heating section into said container;
    a standby section being disposed between said heating section and said blow molding section, said standby section for putting said heated preform on standby; and
    a carrying means for intermittently carrying said preform supported by a carrier member from said heating section to said blow molding section via said standby section; and
    wherein said standby section comprises:
        a temperature conditioning means for conditioning the temperature of at least one part of a surface to be temperature-conditioned of said preform carried from said heating section;
        a positioning means for positioning said carrier member by contacting with said carrier member supporting said preform;
        a first advancing and withdrawing drive means for advancing and withdrawing said temperature conditioning means with respect to said preform; and
        a second advancing and withdrawing drive means for advancing and withdrawing said positioning means with respect to said carrier member.

2. The apparatus as defined in claim 1, wherein said first and second advancing and withdrawing drive means share the same power source.

3. The apparatus as defined in claim 1, wherein said temperature conditioning means is a cooling means for partially cooling said preform.

4. The apparatus as defined in claim 1, wherein said temperature conditioning means is a heating means for partially heating said preform.

5. The apparatus as defined in claim 1, wherein said temperature conditioning means includes a temperature conditioning member which conditions temperature by contacting with said at least one part of the surface of said preform.

6. The apparatus as defined in claim 1, wherein said temperature conditioning means includes a temperature conditioning member which conditions temperature on said at least one part of the surface of said preform without contacting therewith.

7. The apparatus as defined in claim 1, further comprising a circulatory carrying path in which said carrying member is carried circulatorily; and wherein said temperature conditioning means, said positioning means, and said first and second advancing and withdrawing drive means are disposed exterior to said circulatory carrying path.

8. The apparatus as defined in claim 1, wherein at least one of leading and trailing portions of the preform surface in a carrying direction of said preform is said at least one part of the surface of the preform; and wherein said first advancing and withdrawing drive means advances and withdraws said temperature conditioning means in an intersecting direction with the carrying direction of said preform.

9. The apparatus as defined in claim 8, wherein said temperature conditioning means comprises a first temperature conditioning member contacting with said leading portions of the surface of said preform, and a second temperature conditioning member contacting with said trailing portions of the surface of said preform; and wherein said standby section comprises opening and closing means for opening and closing said first and second temperature conditioning members.

10. The apparatus as defined in claim 1, wherein said standby section further comprises a rotation drive means which rotates said carrier member and changes the orientation of said one part of the surface of said preform.

11. The apparatus as defined in claim 10, wherein said carrier member further comprises a sprocket for rotating said carrier member; and wherein said rotation drive means comprises:
a rack engaging with said sprocket of said carrier member; and
a linear movement means linearly moving said rack.

12. The apparatus as defined in claim 11, further comprising raising and lowering means for raising and lowering said rack; and wherein said linear movement means and said first and second advancing and withdrawing drive means share the same power source.

13. The apparatus as defined in claim 11, wherein said sprocket of said carrier member is used for rotating said preform during heating at said heating section.

* * * * *